US009736128B2

(12) United States Patent
Premnath et al.

(10) Patent No.: US 9,736,128 B2
(45) Date of Patent: Aug. 15, 2017

(54) SYSTEM AND METHOD FOR A PRACTICAL, SECURE AND VERIFIABLE CLOUD COMPUTING FOR MOBILE SYSTEMS

(71) Applicants: THE BOARD OF REGENTS, THE UNIVERSITY OF TEXAS SYSTEM, Austin, TX (US); Cornell University, Ithaca, NY (US)

(72) Inventors: Sriram Nandha Premnath, Dallas, TX (US); Zygmunt J. Haas, Richardson, TX (US)

(73) Assignees: The Board of Regents, The University of Texas System, Austin, TX (US); Center for Technology Licensing at Cornell University, Ithaca, NY (US)

( * ) Notice: Subject to any disclaimer, the term of this patent is extended or adjusted under 35 U.S.C. 154(b) by 38 days.

(21) Appl. No.: 14/717,619

(22) Filed: May 20, 2015

(65) Prior Publication Data
US 2015/0341326 A1 Nov. 26, 2015

Related U.S. Application Data
(60) Provisional application No. 62/001,285, filed on May 21, 2014.

(51) Int. Cl.
H04L 9/00 (2006.01)
H04L 29/06 (2006.01)

(52) U.S. Cl.
CPC .......... H04L 63/062 (2013.01); H04L 9/008 (2013.01); H04L 63/08 (2013.01); H04L 2209/04 (2013.01);
(Continued)

(58) Field of Classification Search
CPC . H04L 2209/50; H04L 9/008; H04L 2209/46; H04L 9/0662
See application file for complete search history.

(56) References Cited

U.S. PATENT DOCUMENTS 6,834,272 B1 12/2004 Naor et al.
8,488,791 B2 7/2013 Baechler et al.
(Continued)

FOREIGN PATENT DOCUMENTS

CN 102822816 A 12/2012

OTHER PUBLICATIONS

Martin Abadi, Joan Feigenbaum, "Secure Circuit Evaluation", 1990, Journal of Cryptology, vol. 2, Issue 1, pp. 1-12.*
(Continued)

Primary Examiner — Farid Homayounmehr
Assistant Examiner — Zhimei Zhu
(74) Attorney, Agent, or Firm — Dickinson Wright PLLC; Ross Spencer Garsson

(57) ABSTRACT

Disclosed are systems and methods for delegating computations of resource-constrained mobile clients, in which multiple servers interact to construct an encrypted program representing a garbled circuit. Implementing the garbled circuit, garbled outputs are returned. Such implementations ensure privacy of each mobile client's data, even if an executing server has been colluded. The garbled circuit provides secure cloud computing for mobile systems by incorporating cryptographically secure pseudo random number generation that enables a mobile client to efficiently retrieve a result of a computation, as well as verify that an evaluator actually performed the computation. Cloud computation and communication complexity are analyzed to demonstrate the feasibility of the proposed system for mobile systems.

21 Claims, 14 Drawing Sheets

(52) U.S. Cl.
CPC ...... *H04L 2209/46* (2013.01); *H04L 2209/50* (2013.01)

(56) References Cited

U.S. PATENT DOCUMENTS

| | | | |
|---|---|---|---|
| 8,515,058 B1 | 8/2013 | Gentry | |
| 8,539,220 B2 | 9/2013 | Raykova et al. | |
| 8,630,422 B2 | 1/2014 | Gentry | |
| 2009/0210695 A1* | 8/2009 | Shahindoust | H04L 9/0662 713/150 |
| 2010/0306543 A1 | 12/2010 | Kolesnikov | |
| 2012/0002811 A1* | 1/2012 | Smart | H04L 9/085 380/255 |
| 2012/0233460 A1* | 9/2012 | Kamara | H04L 9/3218 713/168 |
| 2014/0040614 A1 | 2/2014 | Kolesnikov et al. | |
| 2014/0040620 A1 | 2/2014 | Kolesnikov et al. | |

OTHER PUBLICATIONS

Marek Jawurek, Florian Kerschbaum, and Claudio Orlandi. 2013. Zero-knowledge using garbled circuits: how to prove non-algebraic statements efficiently. In Proceedings of the 2013 ACM SIGSAC conference on Computer & communications security (CCS '13). ACM, New York, NY, USA, 955-966.*
Henry Carter et al., "Secure Outsourced Garbled Circuit Evaluation for Mobile Devices", Aug. 14-16, 2013, Proceedings of the 22nd USENIX Security Symposium, pp. 289-304.*
M. Armbrust, A. Fox, R. Griffith, A. D. Joseph, R. Katz, A. Konwinski, G. Lee, D. Patterson, A. Rabkin, I. Stoica, and M. Zaharia, "A view of cloud computing," Commun. ACM, Apr. 2010. ("Ambrust").
E. Barker et al., "Recommendation for key management—part 1: General (revision 3)," NIST Special Publication 800-57, Jul. 2012 ("Barker").
D. Beaver, S. Micali, and P. Rogaway, "The round complexity of secure protocols," in ACM STOC'90 ("Beaver").
A. Ben-David, N. Nisan, and B. Pinkas, "Fairplaymp: A system for secure multi-party computation," in ACM CCS, 2008 ("Ben-David").
L. Blum, M. Blum, and M. Shub, "A simple unpredictable pseudo random number generator," SIAM J. Comput., 15(2):364-383, May 1986 ("Blum").
S. Bugiel, S. Nurnberger, A.-R. Sadeghi, and T. Schneider, "Twin clouds: Secure cloud computing with low latency," in Proc. CMS, 2011 ("Bugiel").
H. Carter, B. Mood, P. Traynor, and K. Butler, "Secure outsourced garbled circuit evaluation for mobile devices," in USENIX Security, 2013 ("Carter").
J. Domingo-Ferrer, A provably secure additive and multiplicative privacy homomorphism, in Proc. Int'l Conf. on Information Security, 2002 ("Domingo-Ferrer").
R. Gennaro et al., "Non interactive verifiable computing: Outsourcing computation to untrusted workers," in CRYPTO, 2010 ("Gennaro").
C. Gentry, "Computing arbitrary functions of encrypted data," Commun. ACM, Mar. 2010 ("Gentry").
O. Goldreich, Foundations of Cryptography: vol. 2, Basic Applications. Cambridge University Press, 2004 ("Goldreich 2004").
O. Goldreich, S. Micali, and A. Wigderson, "How to play any mental game," in ACM STOC, 1987 ("Goldreich 1987").
S. Goldwasser et al., "Reusable garbled circuits and succinct functional encryption," in ACM STOC'13 ("Goldwasser").
W. Henecka et al., "Tasty: Tool for automating secure two-party computations," in ACM CCS'10 ("Henecka").
Y. Huang, D. Evans, and J. Katz, "Private set intersection: Are garbled circuits better than custom protocols," in Network and Distributed System Security Symposium (NDSS). The Internet Society, 2012 ("Huang").
V. Kolesnikov, A.-R. Sadeghi, and T. Schneider, "Improved garbled circuit building blocks and applications to auctions and computing minima," in Proceedings of the 8th International Conference on Cryptology and Network Security, CANS '09, pp. 1-20, Berlin, Heidelberg, 2009. Springer-Verlag ("Kolesnikov").
Y. Lindell and B. Pinkas, "A proof of security of yao's protocol for two-party computation," J. Cryptol., 22(2):161-188, Apr. 2009 ("Lindell 2009 I").
Y. Lindell and B. Pinkas, "Secure multiparty computation for privacy-preserving data mining," Journal of Privacy and Confidentiality, 1(1), 2009 ("Lindell 2009 II").
D. Malkhi, N. Nisan, B. Pinkas, and Y. Sella, "Fairplay—a secure two-party computation system," in USENIX Security, 2004 ("Malkhi").
M. Naor and B. Pinkas, "Efficient oblivious transfer protocols," in ACM SODA, 2001 ("Naor 2001").
M. Naor and B. Pinkas, "Computationally secure oblivious transfer," J. Cryptology, 18(1):1-35, 2005 ("Naor").
R. L. Rivest, L. Adleman, and M. L. Dertouzos, "On data banks and privacy homomorphisms," Foundations of secure computation, 32(4), 1978 ("Rivest").
P. Rogaway, "The round complexity of secure protocols," Ph.D. thesis, MIT, 1991 ("Rogaway").
B. Schneier, Applied Cryptography (2nd Ed.): Protocols, Algorithms, and Source Code in C. John Wiley & Sons, Inc., 1995 ("Schneier").
S. Tillich and N. Smart, Circuits of basic functions suitable for MPC and FHE, http://www.cs.bris.ac.uk/Research /CryptographySecurity/MPC/ ("Tillich").
A. C. Yao, "Protocols for secure computations," in IEEE Computer Society SFCS, 1982 ("Yao 1982").
A. C.-C. Yao, "How to generate and exchange secrets," in IEEE Computer Society SFCS, 1986 ("Yao 1986").
Premnath, Sriram N. & Hass, Zygmunt J.; A Practical, Secure, and Verifiable Cloud Computing for Mobile Systems; Procedia Computer Science, vol. 34 Elsevier, 2014, p. 474-483.

* cited by examiner

SYSTEM AND METHOD FOR A PRACTICAL, SECURE AND VERIFIABLE CLOUD COMPUTING FOR MOBILE SYSTEMS

CROSS-REFERENCE TO RELATED PATENT APPLICATIONS

This application claims priority to provisional U.S. Patent Application Ser. No. 62/001,285, filed May 21, 2014, entitled "System And Method For A Practical, Secure And Verifiable Cloud Computing For Mobile Systems," which provisional patent application is commonly owned by the Applicant of the present invention and is hereby incorporated herein by reference in its entirety for all purposes.

GOVERNMENT INTEREST

This work was supported by the National Science Foundation, "FIA: Collaborative Research: Nebula: A Future Internet That Supports Trustworthy Cloud Computing," CNS-1040689. The U.S. government may have certain rights in the invention.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure is generally related to cloud computing, and more particularly, to systems and methods for providing secure and verifiable cloud computing for mobile systems.

BACKGROUND

Cloud computing systems, in which the clients rent and share computing resources of third party platforms such as Amazon Elastic Cloud, Microsoft Azure, etc., have gained widespread use in recent years. Provisioned with a large pool of hardware and software resources, these cloud computing systems enable clients to perform computations on a vast amount of data without setting up their own infrastructure [Ambrust]. However, providing the cloud service provider with the client data in plaintext form to carry out the computations results in complete loss of data privacy.

Homomorphic encryption [Rivest] is an approach to tackle the problem of preserving data privacy, which can allow the cloud service providers to perform specific computations directly on the encrypted client data, without requiring private decryption keys. Recently, fully homomorphic encryption (FHE) schemes [e.g., Gentry] have been proposed, which enable performing any arbitrary computation on encrypted data. However, FHE schemes are currently impractical for mobile cloud computing applications due to extremely large cipher text size. For instance, to achieve 128-bit security, the client is required to exchange a few Giga bytes of ciphertext with the cloud server, for each bit of the plain text message. [Gentry].

Yao's garbled circuits approach [Yao 1982; Yao 1986] is a potential alternative to FHE schemes that can drastically reduce the ciphertext size. Any computation can be represented using a Boolean circuit, for which, there exists a corresponding garbled circuit. Each gate in a garbled circuit can be unlocked using a pair of input wire keys that correspond to the underlying plaintext bits; and the association between the wire keys and the plaintext bits is kept secret from the cloud server that performs the computation. Unlocking a gate using a pair of input wire keys reveals an output wire key, which, in turn, serves as an input wire key for unlocking the subsequent gate in the next level of the circuit. Thus, garbled circuits can enable oblivious evaluation of any arbitrary function, expressible as a Boolean circuit, on a third-party cloud server.

While garbled circuits preserve the privacy of client data, they are, however, one time programs— using the same version of the circuit more than once compromises the garbled circuit and reveals to an adversarial evaluator whether the semantics have changed or remained the same for a set of input and output wires between successive evaluations. Expecting the client to create a new version of the garbled circuit for each evaluation, however, is an unreasonable solution, since creating a garbled circuit is at least as expensive as evaluating the underlying Boolean circuit! Thus, in contrast to FHE schemes such as that of Gentry, that can directly delegate the desired computation to the cloud servers, a scheme using garbled circuits, presents the additional challenge of efficiently delegating to the cloud servers the creation of garbled circuit.

In works related to the field of the present invention, homomorphic encryption is an approach that enables performing computations directly on the encrypted data, without requiring private decryption keys. For example, in the RSA public key system, the product of two ciphertext messages produces a ciphertext corresponding to the product of the underlying plain text messages [Rivest]. Domingo-Ferrer present a homomorphic scheme that represents ciphertext as polynomials, allowing both addition and multiplication operations on the underlying plain text; however, in this scheme, multiplication operations drastically increase the size of the cipher text. Recently, fully homomorphic encryption (FHE) schemes [e.g., Gentry] have been proposed, which enable performing any arbitrary computation on encrypted data. However, FHE schemes are currently impractical for cloud computing applications due to extremely large cipher text size.

Yao's garbled circuits have been primarily used in conjunction with oblivious transfer protocols for secure two-party computation. [Yao 1982; Yao 1986 Lindell 2009 II]. Lindell 2009 I presents an excellent survey of secure multiparty computation, along with numerous potential applications, such as privacy preserving data mining, private set intersection, electronic voting and electronic auction. A number of secure two-party and multiparty computation systems have been built over the years. [e.g., Henecka; Malkhi; Ben-David]. Note that in secure multiparty computation systems multiple parties hold private inputs and receive the result of the computation; however, in a secure cloud computing system, such as in the present invention, while multiple parties participate in the creation of garbled circuits, only the client holds private inputs and obtains the result of the computation in garbled form. (As discussed below, in the present invention, secure multiparty computation protocols [Goldreich 2004; Goldreich 1987; Beaver; Rogaway] have been adapted, for building a secure and verifiable cloud computing for mobile systems.)

Twin clouds [Bugiel] is a secure cloud computing architecture, in which the client uses a private cloud for creating garbled circuits and a public commodity cloud for evaluating them. While a new garbled circuit is constructed for each evaluation, note that the cost of constructing a garbled circuit is at least as expensive as the cost of evaluating the underlying Boolean circuit. Moreover, while Twin clouds uses a private cloud for creating the garbled circuits, the present solution, on the other hand, employs multiple public cloud servers for creating as well as evaluating the garbled circuits.

While FHE schemes currently remain impractical, they, however, offer interesting constructions, such as reusable garbled circuits [Goldwasser] and verifiable computing capabilities that permit a client to verify whether an untrusted server has actually performed the requested computation [Gennaro]. In the system of the present invention, the client is enabled to efficiently verify whether an untrusted server has actually evaluated the garbled circuit, without relying on any FHE scheme.

Carter proposed an atypical secure two party computation system with three participants: Alice, Bob and a Proxy. In their work, Bob is a webserver that creates garbled circuits, and Alice is a mobile device that delegates the task of evaluating the garbled circuits to the Proxy, which is a cloud server. It is noted that the computation and adversary models in Carter are very different from that of the present invention. First, in Carter's work, being a secure two party computation system, both Alice and Bob provide private inputs for the computation that they wish to perform jointly; however, in the present secure cloud computing model, only one party, i.e., the mobile client, provides inputs and obtains result of the computation in garbled form. Second, Carter's scheme requires that neither Alice nor Bob can collude with the Proxy; in a sharp contrast, the present method preserves the privacy of the client data even if the evaluating server colludes with all but one of the cloud servers that participated in the creation of the garbled circuit.

SUMMARY

The present disclosure provides systems and methods for delegating computations of resource-constrained mobile clients, in which multiple servers interact to construct an encrypted program representing a garbled circuit. In some embodiments, as discussed herein, secure/private execution of software is performed by untrusted (also referred to as "unclassified) servers/entities. That is, by way of explanation, an algorithm/software program is built (i.e., garbled circuit), which includes a set of steps to be performed by at least one other device, whereby not only are the specifics of the program hidden from the executing device(s), but also the inputs and the results are hidden. Executing the garbled circuit, garbled outputs are returned. Such implementations ensure privacy of each mobile client's data, even if an executing server has been colluded. The garbled circuit provides secure cloud computing for mobile systems by incorporating cryptographically secure pseudo random number generation that enables a mobile client to efficiently retrieve the result of a computation, as well as verify that an evaluator actually performed the computation. Cloud computation and communication complexity are analyzed to demonstrate the feasibility of the proposed system for mobile systems. Indeed, a higher level of security and increased efficiency, as well as increased cost-effectiveness is realized.

According to some embodiments, the present disclosure provides systems and methods for secure and verifiable cloud computing computations and communications for mobile systems. According to some embodiments, a client (user or device, or system device) employs a set of (n+2) servers, $\{p_1, p_2, \ldots p_n, p_c, p_e\}$. In some embodiments, the client may be a user, a mobile device, a network service provider, a web service, third party, and the like, and/or some combination thereof. Initially, the client sends a description of the desired computation (such as, but not limited to, for example, addition of two numbers, computation of hamming distance between two bit sequences, and the like), and a unique seed value $s_i$ to each server $p_i$, ($1 \leq i \leq n$). Each of these n servers creates (or retrieves from its repository, if available) a Boolean circuit (B) that corresponds to the requested computation. Using the unique seed value $s_i$, each server $p_i$, ($1 \leq i \leq n$) generates a private pseudorandom bit sequence whose length is proportional to the total number of wires in the Boolean circuit (B). Then, using the private pseudorandom bit sequences and the Boolean circuit (B) as inputs, these n servers interact with one another, while performing some local computations, according to a secure multiparty computation protocol (whether known or to be known), to create their shares ($GC_i$, ($1 \leq i \leq n$)) for a one-time program called a garbled circuit.

According to some embodiments of the present disclosure, once the shares for the garbled circuit are created, the client requests each server, $p_i$, ($1 \leq i \leq n$), to send its share, $GC_i$, to the server $p_c$. Performing an XOR operation on these shares, the server pc creates the desired circuit, $GC = GC_1 \oplus GC_2 \oplus \ldots \oplus GC_n$. Subsequently, the client instructs the server $p_c$ to send the garbled circuit GC to another server $p_e$ for evaluation. Thereafter, using the unique seed values $s_i$, ($1 \leq i \leq n$), the client generates on its own garbled input values for each input wire in the circuit and sends them to the server $p_e$ for evaluation. According to some embodiments, using these garbled inputs, the server $p_e$ unlocks the gates in the first level of the circuit to obtain the corresponding garbled outputs, which, in turn, unlocks the gates in the second level of the circuit, and so on. According to some embodiments, the server $p_e$ unlocks all the gates in the circuit, obtains the garbled outputs of the circuit, and sends them to the client. Therefore, garbled output values are converted (in some embodiments at the directive of the client and/or server) into plaintext bits to recover the result of the desired computation.

In accordance with some embodiments of the present disclosure, the existence of a secure communication channel between the client and each of the (n+2) servers, $\{p_1, p_2, \ldots p_n, p_c, p_e\}$, may be previously established (or assumed), for sending unique seed values for pseudorandom bit generation, identity of the other servers, and the like. In some embodiments, it may also be pre-established that all pairs of communicating servers authenticate one another. In some embodiments, it may be assumed (or pre-established) a capable adversary, where the evaluator $p_e$ may individually collude with any proper subset of the n servers, $\{p_1, p_2, \ldots p_n\}$, and still remain unable to determine the semantics of any garbled value that the evaluator observes during evaluation. Thus, in some embodiments, the disclosed adversary model involves a scenario where, for example, the client may be certain that some (in some embodiments: not all) of the parties are corrupt, however, it is uncertain which of the parties are corrupt. If any adversarial party attempts to eavesdrop and analyze the set of all message exchanges between different parties, and also analyze the set of all the messages that it has legitimately received from the other parties, it still cannot determine the shares of the other parties, or the semantics of the garbled value pairs that are assigned to each wire in the circuit. Further, if the evaluator, pe, returns arbitrary numbers as outputs to the client, the client can detect this efficiently. In accordance with the systems and methods of the present disclosure, according to some embodiments, a new garbled circuit can be created for every evaluation. This prevents an adversarial evaluator from determining the set of inputs and outputs that have changed or remained the same between different evaluations.

In accordance with one or more embodiments, a method is disclosed which includes receiving, at a computing device, a selection of at least a predetermined number of servers in a cloud, the cloud comprising a cluster of devices associated with a network; establishing, via the computing device, a connection with each selected server, the connection comprising a secure communication channel; receiving, at the computing device, client information comprising a description of a desired computation and a unique seed value for each selected server; determining, via the computing device, a Boolean circuit that corresponds to the desired computation, the determination comprising generating garbled values based on the unique seed value via a pseudo-random number generation algorithm, wherein the pseudo-random number generation algorithm generates a pseudo-random bit sequence comprising information corresponding to the Boolean circuit; creating, via the computing device, a garbled circuit based on the determination of the Boolean circuit, the creation comprises facilitating communication between the selected servers using the pseudorandom bit sequence; evaluating, via the computing device, the garbled circuit, the evaluation comprises generating garbled inputs that unlock the garbled circuit based on the unique seed value; and determining, via the computing device, garbled outputs that correspond to the garbled inputs.

In accordance with some embodiments, the method further includes receiving a second unique seed value for each selected server, the second unique seed value comprising information associated with symmetric key security parameters of for the selected servers; generating, for each selected server, pseudorandom bits in accordance with the second unique seed value; and receiving shares associated with each selected server, wherein each share is implemented for the creation of the garbled circuit, wherein the evaluation comprises performing an XOR operation of each received share.

In some embodiments, the method involves the determination of the Boolean circuit further comprising determining if the Boolean circuit exists, wherein if the circuit exists retrieving information from an associated repository for performing the desired computation, and wherein if the Boolean circuit does not yet exist, creating the Boolean circuit via the selected servers.

In some embodiments, the method involves translating the garbled values into plaintext bits, the translation occurring in association with recovering the garbled outputs for determining the result of the desired computation.

In some embodiments, the method involves matching the generated garbled outputs as a result of the evaluation with the expected garbled outputs, the matching based upon a security parameter integer value associated with each selected server (which, in some embodiments can be comprised with the client information), wherein if the garbled outputs and the expected garbled outputs match at least above a threshold, the desired computation is confirmed.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for providing secure and verifiable cloud computing computations and communications for mobile systems.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

In general, in one aspect, the invention features a method that includes receiving, at a computing device, a selection of at least a predetermined number of servers in a cloud. Said cloud includes a cluster of devices associated with a network. The method further includes establishing, via the computing device, a connection with each selected server. Said connection includes a secure communication channel. The method further includes receiving, at the computing device, client information comprising at least a description of a desired computation and a unique seed value for each selected server. The method further includes determining, via the computing device, a Boolean circuit that corresponds to said desired computation. Said determination includes generating garbled values based on the unique seed value via a pseudo-random number generation algorithm. Said pseudo-random number generation algorithm generates a pseudorandom bit sequence including information corresponding to said Boolean circuit. The method further includes creating, via the computing device, a garbled circuit based on said determination of the Boolean circuit. Said creation includes facilitating communication between said selected servers using the pseudorandom bit sequence. The method further includes evaluating, via the computing device, said garbled circuit. Said evaluation includes generating garbled inputs that unlock said garbled circuit based on said unique seed value. The method further includes determining, via the computing device, garbled outputs that correspond to said garbled inputs.

Implementations of the invention can include one or more of the following features:

Said predetermined number of servers can be at least two individual servers in said cloud.

Said client information can further include an integer value associated with a public key security parameter for each server.

The method can further include receiving a second unique seed value for a pair of the selected servers. Said second unique seed value can include information associated with symmetric key security parameters of for the selected servers.

Said garbled circuit creation can further include generating, for each selected server, pseudorandom bits in accordance with said second unique seed value.

The method can further include receiving shares associated with each selected server. Each share can be implemented for said creation of the garbled circuit.

Said generation can include performing an XOR operation of each received share.

Said determination of the Boolean circuit can further include determining if said Boolean circuit exists, and, (a) if said circuit exists, retrieving information from an associated repository for performing said desired computation, and (b) if said Boolean circuit does not yet exist, creating said Boolean circuit via said selected servers.

Said pseudorandom bit sequence information can include a length denoting a total number of wires in the Boolean circuit.

Said garbled inputs and garbled outputs can be unrecognizable to said computing device. Said garbled inputs and garbled outputs can remain unrecognizable upon said computing device colluding with any strict subset of said selected servers.

The method can further include translating, via the computing device, said garbled values into plaintext bits. Said translation can occur in association with recovering said garbled outputs for determining a result of the desired computation.

The method can further include matching, via the computing device, said generated garbled outputs as a result of said evaluation with expected garbled outputs. Said matching can be based upon said security parameter integer value. If said garbled outputs and the expected garbled outputs match at least above a threshold, said desired computation can be confirmed.

In general, in another aspect, the invention features a non-transitory computer-readable storage medium tangibly encoded with computer executable instructions that when executed by a processor associated with a computing device, perform a method including receiving a selection of at least a predetermined number of servers in a cloud. Said cloud including a cluster of devices associated with a network. The method of the non-transitory computer-readable storage medium further including establishing a connection with each selected server. Said connection including a secure communication channel. The method of the non-transitory computer-readable storage medium further including receiving client information including at least a description of a desired computation and a unique seed value for each selected server. The method of the non-transitory computer-readable storage medium further including determining a Boolean circuit that corresponds to said desired computation. Said determination including generating garbled values based on the unique seed value via a pseudo-random number generation algorithm. Said pseudo-random number generation algorithm generates a pseudorandom bit sequence including information corresponding to said Boolean circuit. The method of the non-transitory computer-readable storage medium further including creating a garbled circuit based on said determination of the Boolean circuit. Said creation including facilitating communication between said selected servers using the pseudorandom bit sequence. The method of the non-transitory computer-readable storage medium further including evaluating said garbled circuit. Said evaluation including generating garbled inputs that unlock said garbled circuit based on said unique seed value. The method of the non-transitory computer-readable storage medium further including determining garbled outputs that correspond to said garbled inputs.

Implementations of the invention can include one or more of the following features:

The method of the non-transitory computer-readable storage medium can further include receiving a second unique seed value for a pair of selected servers. Said second unique seed value can include information associated with symmetric key security parameters of for the selected servers. The method of the non-transitory computer-readable storage medium can further include generating, for each selected server, pseudorandom bits in accordance with said second unique seed value. The method of the non-transitory computer-readable storage medium can further include receiving shares associated with each selected server. Each share can be implemented for said creation of the garbled circuit. Said generation can include performing an XOR operation of each received share.

Said determination of the Boolean circuit can further include determining if said Boolean circuit exists and (a) if said circuit exists, retrieving information from an associated repository for performing said desired computation, and (b) if said Boolean circuit does not yet exist, creating said Boolean circuit via said selected servers.

The method of the non-transitory computer-readable storage medium can further include translating said garbled values into plaintext bits. Said translation can occur in association with recovering said garbled outputs for determining a result of the desired computation.

Said client information can further include an integer value associated with a security parameter for each server. Said method can further include matching said generated garbled outputs as a result of said evaluation with said expected garbled outputs. Said matching can be based upon said security parameter integer value. If said garbled outputs and expected garbled outputs match at least above a threshold, said desired computation can be confirmed.

In general, in another aspect, the invention features a system that includes at least one computing device including memory storing computer-executable instructions and one or more processors for executing said computer-executable instructions. Said computer-executable instructions include receiving a selection of at least a predetermined number of servers in a cloud. Said cloud including a cluster of devices associated with a network. Said computer-executable instructions further include establishing a connection with each selected server. Said connection including a secure communication channel. Said computer-executable instructions further include receiving client information including at least a description of a desired computation and a unique seed value for each selected server. Said computer-executable instructions further include determining a Boolean circuit that corresponds to said desired computation. Said determination including generating garbled values based on the unique seed value via a pseudo-random number generation algorithm. Said pseudo-random number generation algorithm generates a pseudorandom bit sequence comprising information corresponding to said Boolean circuit. Said computer-executable instructions further include creating a garbled circuit based on said determination of the Boolean circuit. Said creation includes facilitating communication between said selected servers using the pseudorandom bit sequence. Said computer-executable instructions further include evaluating said garbled circuit. Said evaluation includes generating garbled inputs that unlock said garbled circuit based on said unique seed value. Said computer-executable instructions further include determining garbled outputs that correspond to said garbled inputs.

Implementations of the invention can include one or more of the following features:

The computer-executable instructions can further include receiving a second unique seed value for a pair of selected servers. Said second unique seed value can include information associated with symmetric key security parameters of for the selected servers. The computer-executable instructions can further include generating, for each selected server, pseudorandom bits in accordance with said second unique seed value. The computer-executable instructions can further include receiving shares associated with each selected server. Each share can be implemented for said creation of the garbled circuit. Said generation can include performing an XOR operation of each received share.

The computer-executable instructions can further include matching said generated garbled outputs as a result of said evaluation with expected garbled outputs. Said matching can be based upon a security parameter integer value associated with each selected server. If said garbled outputs and expected garbled outputs match at least above a threshold, said desired computation can be confirmed.

Figure 1:
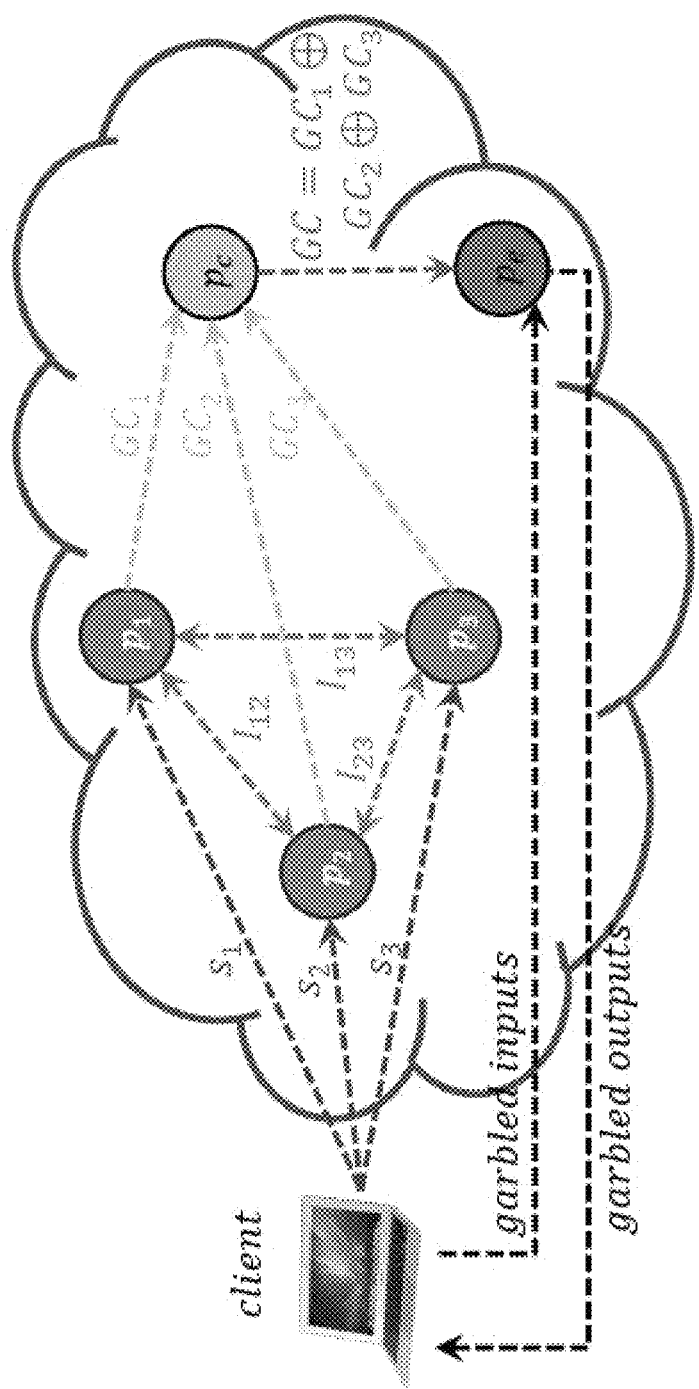
FIG. 1 depicts a secure cloud computing model of the present invention with n+2=5 servers. (1) Client sends unique seed value, $s_i$, to each $p_i$, ($1 \le i \le 3$); (2) $p_1$ $p_2$, $p_3$ interact ($I_{ij}$, $1 \le i \le j \le 3$) to construct shares of the garbled circuit GC; (3) Each $p_i$ sends its share ($GC_i$) to $p_c$; (4) $p_c$ computes $GC=GC_1 \oplus GC_2 \oplus GC_3$, and sends it to $p_e$; (5) Client generates garbled inputs, and sends them to $p_e$; and (6) $p_e$ evaluates GC, and sends the garbled outputs to the client.

Objects, features, and advantages of the disclosure will be apparent from the description of embodiments as illustrated in the accompanying drawings. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se).

Cloud computing systems, in which clients rent and share computing resources of third party platforms, have gained widespread use in recent years. Furthermore, cloud computing for mobile systems (i.e., systems in which the clients are mobile devices) have too been receiving considerable attention in technical literature. A new method has been discovered of delegating computations of resource-constrained mobile clients, in which multiple servers interact to construct an encrypted program known as garbled circuit. Next, using garbled inputs from a mobile client, another server executes this garbled circuit and returns the resulting garbled outputs. The system of the present invention assures privacy of the mobile client's data, even if the executing server chooses to collude with all but one of the other servers. The garbled circuit design of Beaver and the secure multiparty computation protocol of Goldreich 1987, Goldreich 2004 have been adapted for the purpose of building a secure cloud computing for mobile systems. The method of the present invention incorporates the novel use of the cryptographically secure pseudo random number generator of Blum that enables the mobile client to efficiently retrieve the result of the computation, as well as to verify that the evaluator actually performed the computation. The computation and communication complexity of the system of the present invention was analyzed, and also the time taken to construct and evaluate the garbled circuit for varying number of servers was measured. The results demonstrated the feasibility of a secure and verifiable cloud computing for mobile systems.

In embodiments of the present invention, whenever the client needs to perform a computation, the client employs a number of cloud servers to create a new version of the garbled circuit in a distributed manner. Each server generates a set of private input bits using unique seed value from the client and interacts with all the other servers to create a new garbled circuit, which is a function of the private input bits of all the servers. Essentially, the servers engage in a secure multiparty computation protocol [e.g., Goldreich 1987; Goldreich 2004] to construct the desired garbled circuit without revealing their private inputs to one another. Once a new version of the garbled circuit is created using multiple servers, the client delegates the evaluation to an arbitrary server in the cloud. The resulting version of the garbled circuit, the garbled inputs that can unlock the circuit, and the corresponding garbled outputs, remain unrecognizable to the evaluator, even if it chooses to collude with any strict-subset of servers that participated in the creation of the garbled circuit.

The proposed system of the present invention is designed to readily exploit the real-world asymmetry that exists between typical mobile clients and cloud servers while—the mobile clients are resource constrained, the cloud servers, on the other hand, are sufficiently provisioned to perform numerous intensive computation and communication tasks. To achieve secure and verifiable computing capability, the present system requires very little computation and communication involvement from the mobile client beyond the generation and exchange of small cipher text messages. However, using significantly larger resources available to them, the cloud servers can efficiently generate and exchange a large volume of random bits necessary for carrying out the delegated computation. Thus, the proposed scheme is very suitable for mobile environments.

The garbled circuit design of Beaver and Rogaway, and the secure multiparty computation protocol of Goldreich 1987 and Goldreich 2004 were adapted to suit them for the purpose of building a secure cloud computing system. To facilitate the construction of the garbled circuit, and also to enable the client to efficiently retrieve and verify the result of the computation, the present method incorporates the novel use of the cryptographically secure pseudo random number generator of Blum [see also in Schneier], whose strength relies on the computational difficulty of factorizing large numbers into primes. The proposed system enables the client to efficiently verify that the evaluator actually and fully performed the requested computation.

Advances in the field include: (i) the design of a secure mobile cloud computing system using multiple servers that enables the client to delegate any arbitrary computation, (ii) a system that assures the privacy of the client input and the result of the computation, even if the evaluating server colludes with all but one of the servers that created the garbled circuit, (iii) a system that enables the client to efficiently retrieve/recover the result of the computation and to verify whether the evaluator actually performed the computation, (iv) a comprehensive analysis of the communication and computational complexity of a proposed scheme (these show that, in comparison to Gentry's FHE scheme, the scheme of the present invention drastically reduces the size of the messages that the mobile client exchanges with the servers in the cloud, and (v) measurement of the time taken to construct and evaluate the garbled circuit for varying number of servers, demonstrating the feasibility of the present system.

System Overview

In a system of the present invention, the client can employ a set of (n+2) servers, $\{P_1, p_2, \ldots, p_n, p_c, p_e\}$. Initially, the client sends a description of the desired computation (such as addition of two numbers, computation of hamming distance between two bit sequences, etc.), and a unique seed value $s_i$, to each server $p_i$, ($1 \le i \le n$). Each of these n servers first creates (or retrieves from its repository, if available already) a Boolean circuit (B) that corresponds to the requested computation. Using the unique seed value, $s_i$, each server $p_i$, ($1 \le i \le n$) generates a private pseudorandom bit sequence whose length is proportional to the total number of wires in the Boolean circuit (B). Then, using the private pseudorandom bit sequences and the Boolean circuit (B) as inputs, these n servers interact with one another, while performing some local computations, according to a secure multiparty computation protocol, to create their shares ($GC_i$, ($1 \le i \le n$)) for an one-time program called garbled circuit.

Once the shares for the garbled circuit are created, the client requests each server, $p_i$, ($1 \le i \le n$), to send its share, $GC_i$, to the server $p_c$. Performing an XOR operation on these shares, the server $p_c$ creates the desired circuit, $GC = GC_1 \oplus GC_2 \oplus \ldots \oplus GC_n$. Subsequently, the client instructs the server $p_c$ to send the garbled circuit GC to another server $p_e$ for evaluation.

Now, using the unique seed values, $s_i$, ($1 \le i \le n$), the client generates on its own garbled input values for each input wire in the circuit and sends them to the server $p_e$ for evaluation. Using these garbled inputs, the server $p_e$ unlocks the gates in the first level of the circuit to obtain the corresponding garbled outputs, which, in turn, unlocks the gates in the second level of the circuit, and so on. In this manner, the server $p_e$ unlocks all the gates in the circuit, obtains the garbled outputs of the circuit, and sends them to the client.

The client now converts these garbled output values into plaintext bits to recover the result of the desired computation.

FIG. 1 depicts an overview of a secure cloud computing system model with (n+2)=5 servers.

Adversary Model

The existence of a secure communication channel is assumed between the client and each of the (n+2) servers, $\{p_1, p_2, \ldots, p_n, p_c, p_e\}$, for sending unique seed values for pseudorandom bit generation, identity of the other servers, etc. It is also assumed that all pairs of communicating servers authenticate one another. A very capable adversary is assumed, where the evaluator $p_e$ may individually collude with any proper subset of the n servers, $\{p_1, p_2, \ldots, p_n\}$, and still remain unable to determine the semantics of any garbled value that the evaluator observes during evaluation. Thus, the adversary model depicts a very realistic scenario—where the client may be certain that some (however, not all) of the parties are corrupt, however, it is uncertain which of the parties are corrupt. If any adversarial party attempts to eavesdrop and analyze the set of all message exchanges between different parties, and also analyze the set of all the messages that it has legitimately received from the other parties, it still cannot determine the shares of the other parties, or the semantics of the garbled value pairs that are assigned to each wire in the circuit. Further, if the evaluator, $p_e$, returns arbitrary numbers as outputs to the client, the client can detect this efficiently. In the present model, a new garbled circuit is created for every evaluation. This prevents an adversarial evaluator from determining the semantics of inputs and outputs across different evaluations.

Main Characteristics of the System

Some of the main features of the secure cloud computing system of the present invention include.

Offloaded Computation: The client delegates the intensive computational tasks to the cloud servers of creating and evaluating the garbled circuit. The client only chooses the cloud servers, provides them with unique seed values, generates garbled inputs during evaluation, and interprets garbled outputs returned by the evaluator.

Decoupling: The process of creating the garbled circuit is decoupled from the process of evaluating the garbled circuit. While the servers, $p_i$, ($1 \le i \le n$), interact with one another for creating the garbled circuit, the server $p_e$ evaluates the garbled circuit, independently.

Precomputation of Garbled Circuits: Decoupling in turn allows for the precomputation (i.e., creation) of many versions of the garbled circuit for a given computation, in advance, and storing them (e.g., at the evaluator, $p_e$) for later use. Consequently, the evaluator, $p_e$, can carry out the requested computation readily, without waiting for the other servers to first create a garbled circuit, and obtain it from them. Thus, the client will only incur the relatively short time taken to evaluate the garbled circuit. In other words, precomputation will drastically improve the response time.

Collusion Resistance: To interpret any garbled value, the evaluator, $p_e$, would need to collude with all the n servers, $p_i$, ($1 \le i \le n$). Thus, even if (n−1) out of the n servers are corrupt and collude with the evaluator, the privacy of the client's inputs and the result of the computation are still preserved.

Verification of Outputs: The client has the ability to verify that the evaluator actually carried out the requested computation.

Garbled Circuit And Oblivious Transfer Protocols

The construction and evaluation of Yao's garbled circuits [Yao 1982; Yao 1986] and the oblivious transfer protocols of Naor and Pinkas [Naor 2001; Naor 2005] is as follows:

Yao's Garbled Circuit

Each wire in the circuit is associated with a pair of keys known as garbled values that correspond to the underlying binary values. For example, the circuit in FIG. 2 has seven wires, $\omega_i$, ($0 \le i \le 6$), and three gates, P, Q, R, denoting OR, AND, XOR gates respectively. Keys $\omega_i^0$, $\omega_i^1$ represent the garbled values corresponding to binary values 0, 1 respectively on the wire $\omega_i$.

Each gate in the circuit, is associated with a list of four values, in a random order, known as garbled table.

Figure 2:
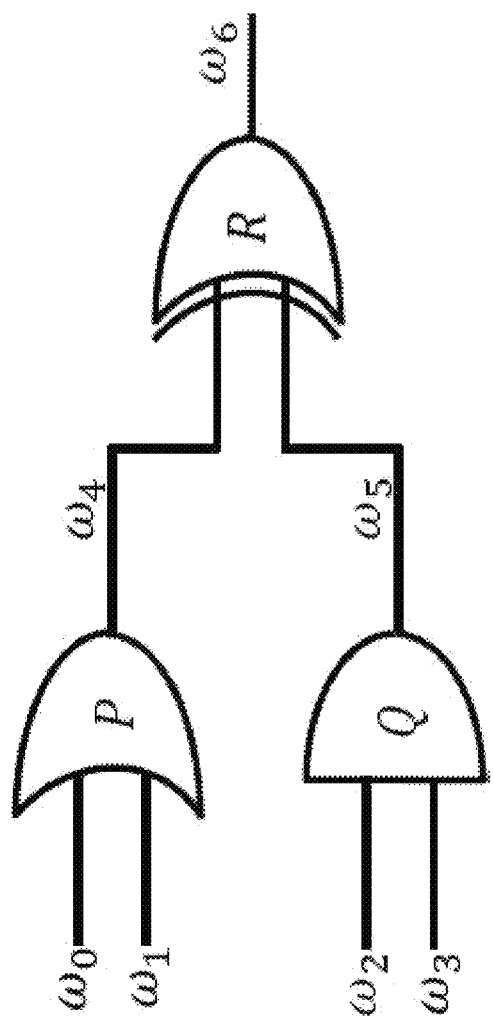
FIG. 2 depicts a circuit with three gates (P, Q, and R) and seven wires, $\omega_i$, ($0 \le i \le 6$).

Table 1 shows the garbled tables for the gates P, Q, R of FIG. 2. Let $x,y \in \{0,1\}$. Let $E_k[v]$ denote the encryption of v using k as the key. Then, each entry in the garble table for P is of the form, $E_{\omega_0^x}[E_{\omega_1^y}[\omega_4^{x|y}]]$. Similarly, each entry in the garble table for Q and R are of the forms, $E_{\omega_2^x}[E_{\omega_3^y}[\omega_5^{x \cdot y}]]$ and $E_{\omega_4^x}[E_{\omega_5^y}[\omega_6^{x \oplus y}]]$, respectively.

TABLE 1

Garbled Tables for Gates P, Q, R

| P | Q | R |
|---|---|---|
| $E_{\omega_0^0}[E_{\omega_1^1}[\omega_4^1]]$ | $E_{\omega_2^0}[E_{\omega_3^1}[\omega_5^0]]$ | $E_{\omega_4^1}[E_{\omega_5^1}[\omega_6^0]]$ |
| $E_{\omega_0^0}[E_{\omega_1^0}[\omega_4^0]]$ | $E_{\omega_2^1}[E_{\omega_3^0}[\omega_5^0]]$ | $E_{\omega_4^0}[E_{\omega_5^0}[\omega_6^0]]$ |
| $E_{\omega_0^1}[E_{\omega_1^1}[\omega_4^1]]$ | $E_{\omega_2^0}[E_{\omega_3^0}[\omega_5^0]]$ | $E_{\omega_4^1}[E_{\omega_5^0}[\omega_6^1]]$ |
| $E_{\omega_0^1}[E_{\omega_1^0}[\omega_4^1]]$ | $E_{\omega_2^1}[E_{\omega_3^1}[\omega_5^1]]$ | $E_{\omega_4^0}[E_{\omega_5^1}[\omega_6^1]]$ |

Suppose that the client wishes to delegate the computation of FIG. 2, i.e., $((a|b) \oplus (c \cdot d))$, to a server in the cloud. The server is provided with a description of the circuit (FIG. 2) along with the set of the garbled tables (Table 1), which together represents a garbled circuit. However, the client keeps the mapping between the garbled values and the underlying binary values as secret. For example, to evaluate the circuit with inputs a=1, b=0, c=0, d=1, the client provides the set of garbled inputs, $\omega_0^1$, $\omega_1^0$, $\omega_2^0$, $\omega_3^1$, to the cloud server.

Now, assume that there exists a mechanism to determine whether a value is decrypted correctly; for example, through zero-padding. Using $\omega_0^1$, $\omega_1^0$ 1 as keys, the server attempts to decrypt all the four entries in the garbled table for gate P; however, only the fourth entry will decrypt correctly to reveal the garbled output $\omega_4^1$. Similarly, on using $\omega_2^0$, $\omega_3^1$ as keys, the first entry in the garbled table for gate Q reveals the garbled output $\omega_5^0$. Finally, on using $\omega_4^1$, $\omega_5^0$ as keys, the third entry in the garbled table for gate R reveals the garbled output $\omega_6^1$. Thus, the server can perform an oblivious evaluation of the garbled circuit and return the result of the computation $\omega_6^1$ to the client. Using the secret mapping, the client can determine that the garbled value $\omega_6^1$ corresponds to the binary value 1.

In the present invention, an alternative garbled circuit design from Beaver and Rogaway was used, and it was adapted, as described below, for the purpose of building a secure cloud computing system.

1-Out-of-2 Oblivious Transfer

There are two parties, a sender and a chooser. The sender holds two messages, $M_0$, $M_1$, and the chooser holds a choice bit, $\sigma \in \{0, 1\}$. At the end of the 1-out-of-2 oblivious transfer (OT) protocol, the chooser learns $M_\sigma$ only, while the sender learns nothing.

Let p=2q+1 denote a safe prime number; i.e., g is also a prime number. Let $Z^*_p = \{1, 2, 3, 4, \ldots, (p-1)\}$, which denotes the set of integers that are relatively prime to p. Let G denote a subgroup of $Z^*_p$, where $|G|=q$. Let g denote the generator for G.

The sender randomly chooses an element, $C \in G$, and sends it to the chooser. Note that the discrete logarithm of C is unknown to the chooser. The chooser randomly selects an integer, k, ($1 \le k \le q$), and sets $PK_\sigma = g^k \mod p$, and $PK_{1-\sigma} = C \times (PK_\sigma)^{-1} \mod p$. The chooser sends $PK_0$ to the sender. Note that $PK_0$ does not reveal the choice bit $\sigma$ to the sender.

The sender calculates $PK_1 = C \times (PK_0)^{-1} \mod p$ on its own, and randomly chooses two elements, $r_0, r_1 \in G$. Let h(x) denote the output of the hash function (e.g., SHA-128) on input x. Let $E_i$ denote the encryption of $M_i$, $\forall i \in \{0, 1\}$. Then, the sender calculates $E_i = [(g^{r_i} \mod p), (h(PK_i^{r_i} \mod p) \oplus M_i)]$, and sends both $E_0$, $E_1$ to the chooser.

The chooser decrypts $E_\sigma$ to obtain $M_\sigma$ as follows. Let $l_1 = g^{r_\sigma} \mod p$ and $l_2 = (h(PK_\sigma^{r_\sigma} \mod p) \oplus M_\sigma$ denote the first and second numbers respectively in $E_\sigma$. The chooser calculates $M_\sigma$ using the relation, $M_\sigma = h(l_1^k \mod p) \oplus l_2$. Note that since the discrete logarithm of C, and hence $PK_{1-\sigma}$, is unknown to the chooser, it cannot retrieve $MK_{1-\sigma}$ from $E_{1-\sigma}$.

1-Out-of-4 Oblivious Transfer

There are two parties, a sender and a chooser. The sender holds four messages, $M_{00}$, $M_{01}$, $M_{10}$, $M_{11}$, and the chooser holds two choice bits, $\sigma_1, \sigma_2$. At the end of the 1-out-of-4 oblivious transfer (OT) protocol, the chooser learns $M_{\sigma_1 \sigma_2}$ only, while the sender learns nothing.

The sender randomly generates two pairs of keys, $(L_0, L_1)$, $(R_0 R_1)$, and computes the encryptions of $M_{00}$, $M_{01}$, $M_{10}$, $M_{11}$ as follows. Let $F_k(x)$ denote the output of a pseudorandom function such as AES-128, that is keyed using k on the input x. Let $E_{ij}$ denote the encryption of $M_{ij}$, $\forall i,j \in \{0, 1\}$. Then, $E_{ij} = M_{ij} \oplus F_{L_i}(2i+j+1) \oplus F_{R_j}(2i+j+1)$.

The sender and the chooser engage in 1-out-of-2 OT twice. In the first 1-out-of-2 OT, the sender holds two messages, $L_0 L_1$, and the chooser holds the choice bit, $\sigma_1$; at the end of this OT, the chooser obtains $L_{\sigma_1}$. In the second 1-out-of-2 OT, the sender holds two messages, $R_0 R_1$, and the chooser holds the choice bit, $\sigma_2$; at the end of this OT, the chooser obtains $R_{\sigma_2}$.

Now, the sender sends all the four encryptions, $E_{00} E_{01} E_{10} E_{11}$, to the chooser. Using $L_{\sigma_1}$, $R_{\sigma_2}$, the chooser decrypts $E_{\sigma_1 \sigma_2}$ to obtain $M_{\sigma_1 \sigma_2}$, as $M_{\sigma_1 \sigma_2} = E_{\sigma_1 \sigma_2} \oplus F_{L_{\sigma_1}}(2\sigma_1 + \sigma_2 + 1) \oplus F_{R_{\sigma_2}}(2\sigma_1 + \sigma_2 + 1)$.

Secure and Verifiable Cloud Computing for Mobile Systems

Construction and Evaluation of Garbled Circuits

The construction of BMR garbled circuit [Beaver; Rogaway] is presented using n servers through the secure multiparty computation protocol of Goldreich 2004, Goldreich 1987.

Construction of the Garbled Circuit, GC

For each gate, A, in the circuit, n servers, $p_i$, ($1 \le i \le n$), interact to compute an ordered list of four values, $[A_{00}, A_{01}, A_{10}, A_{11}]$ using the secure multiparty computation protocol of Goldreich [11, 12]. This ordered list represents the garbled table for gate A. In the following, the construction of one specific entry in a garbled table is described.

Let G denote a pseudorandom generator, which on providing a k-bit input seed, outputs a sequence of (2 nk+2) bits, i.e., if $|s|=k$, then $|G(s)|=(2 nk+2)$. G may represent the output of AES block cipher in output feedback mode, for example. Let $G_0(s)$ and $G_1(s)$ denote the first and last (nk+1) bits of $G(s)$, respectively.

Each wire in the circuit is associated with a pair of garbled values representing the underlying plaintext bits 0 and 1. Each garbled value is (nk+1) bits long. Let A denote a specific gate in the circuit, whose two input wires are x, y; and whose output wire is z. Let $(\alpha_0,\alpha_1)$, $(\beta_0,\beta_1)$ and $(\gamma_0,\gamma_1)$ denote the pair of garbled values associated with the wires x, y and z, respectively. Note that $LSB(\alpha_0)=LSB(\beta_0)=LSB(\gamma_0)=0$ and $LSB(\alpha_1)=LSB(\beta_1)=LSB(\gamma_1)=1$.

Each wire in the circuit is also associated with a 1-bit value that determines the semantics for the pair of garbled values. Specifically, the garbled value whose LSB=b represents the underlying plaintext bit $(b \oplus \lambda)$.

Let $\lambda_x$, $\lambda_y$, $\lambda_z$ denote the $\lambda$ values for the wires x, y, z respectively. Then, $\lambda_x = \oplus_{i=1}^{n} \lambda_{xi}, \lambda_y = \oplus_{i=1}^{n} \lambda_{yi}, \lambda_z = \oplus_{i=1}^{n} \lambda_{zi}$, where $\lambda_{xi}, \lambda_{yi}, \lambda_{zi}$ are shares of server $p_i, (1 \le i \le n)$. Note that the $\lambda$ value of each wire is unknown to any individual server. Consequently, during the evaluation of the garbled circuit, the server $p_e$ cannot determine the semantics of any observed garbled value, even if $p_e$ colludes with any proper subset (S) of the n servers ($S \subset \{p_1, p_2, \ldots, p_n\}$).

Let a, b, c $\in \{0,1\}$. Each garbled value is a concatenation of shares as follows: $\alpha_a = \alpha_{a1} \| \alpha_{a2} \| \alpha_{a3} \| \ldots \| \alpha_{an} \| \alpha$; $\beta_b = \beta_{b1} \| \beta_{b2} \| \beta_{b3} \| \ldots \| \beta_{bn} \| b$; $\gamma_c = \gamma_{c1} \| \gamma_{c2} \| \gamma_{c3} \| \ldots \| \gamma_{cn} \| c$; where $\alpha_{ai}, \beta_{bi}, \gamma_{ci}$ are shares of server pi, $(1 \le i \le n)$.

Let $\otimes \in \{XOR, AND\}$ denote the binary operation of gate A. Then, the value of one specific entry, $A_{ab} = \gamma_{[((\lambda_x \oplus a) \otimes (\lambda_y \oplus b)) \oplus \lambda_z]} \oplus [G_b(\alpha_{a1}) \oplus G_b(\alpha_{a2}) \oplus \ldots \oplus G_b(\alpha_{an})] \oplus [G_a(\beta_{b1}) \oplus G_a(\beta_{b2}) \oplus \ldots \oplus G_a(\beta_{bn})]$.

To compute a garbled table entry $A_{ab}$, such as the one shown above, the n servers use the secure multiparty computation protocol of Goldreich [11, 12] (Section 4.1.2), where $f(x_1, x_2, \ldots, x_n) = A_{ab}$, and for each server, $p_i$, $(1 \le i \le n)$, its private input, $x_i$ is a vector: $x_i = [\lambda_i^x, \lambda_i^y, \lambda_i^z, G_b(\alpha_{ai}), G_a(\beta_{bi}), \gamma_{0i}, \gamma_{1i}]$. Note that $x_i$ has a fixed length of $m=(3+2(nk+1)+2k)$ bits.

In this manner, n servers can jointly compute each entry in the garbled table for each gate in the circuit.

Secure Multiparty Computation of an Entry, $A_{Ab}$

Assume that n parties need to compute the value of an arbitrary function of their private inputs, namely $f(x_1, x_2, \ldots, x_n)$ without revealing their private inputs to one another. Assume that the function $f(x_i, x_2, \ldots, x_n)$ is expressed as a Boolean circuit (B') using a set of XOR and AND gates. (Boolean circuit B' is different from Boolean circuit B. While B is a circuit that corresponds to the computation requested by the client (e.g., addition of two numbers), B' is a circuit that creates the entries such as $A_{ab}$ in the garbled tables of the garbled circuit GC).

The secure multiparty computation protocol of Goldreich 2004, Goldreich 1987 is briefly described as follows. For each wire in the Boolean circuit, the actual binary value corresponds to the XOR-sum of shares of all the n parties.

Evaluation of each XOR gate in the circuit is carried out locally. Specifically, each party merely performs an XOR operation over its shares for the two input wires to obtain its share for the output wire.

Evaluation of each AND gate in the circuit, on the other hand, requires communication between all pairs of parties. For the two inputs wires to the AND gate, let $a_i, b_i$ denote the shares of party $p_i$; and let $a_j, b_j$ denote the shares of party $p_j$. Then, the XOR-sum of the shares for the output wire of the AND gate is expressed as follows:

$$(\oplus_{i=1}^{n} a_i) \cdot (\oplus_{i=1}^{n} b_i) = [\oplus D_{1 \le i < j \le n}((a_i \oplus a_j) \cdot (b_i \oplus b_j))]$$
$$\oplus_{i=1}^{n} ((a_i \cdot b_i) \cdot 1), \text{ where } 1 = n \mod 2.$$

Each party $p_i$ locally computes $((a_i \cdot b_i) \cdot 1)$; and the computation of each partial-product, $((\alpha_i \oplus a_j) \cdot (b_i \oplus b_j))$, is accomplished using 1-out-of-4 oblivious transfer (OT) between $p_i$ and $p_j$, such that no party reveals its shares to the other party [Goldreich 2004; Goldreich 1987].

Following the above procedure, the n parties evaluate every gate in the circuit. Thus, in the end, for the BMR protocol, as described above, each server $p_i$, $(1 \le i \le n)$, obtains the share, $(f(x_1, x_2, \ldots, x_n))_i = (A_{ab})_i$, such that $f(x_1, x_2, \ldots, x_n) = A_{ab} = \oplus_{i=1}^{n} (A_{ab})_i$.

Evaluation of the Garbled Circuit, GC

The garbled table for each gate, A, in the circuit is an ordered list of four values, $[A_{00}, A_{01}, A_{10}, A_{11}]$.

Let $\alpha$, $\beta$ denote the garbled values for the two input wires of a gate during evaluation. Let a, b denote the LSB values of $\alpha$, $\beta$ respectively. Then, the garbled value for the output wire, $\gamma$, is recovered using $\alpha$, $\beta$, $A_{ab}$, as shown in the two-step process below:

1. Split the most significant nk bits of a into n parts, $\alpha_1, \alpha_2, \alpha_3, \ldots, \alpha_n$, each with k bits; similarly, split the most significant nk bits of $\beta$ into n parts, $\beta_1, \beta_2, \beta_3, \ldots, \beta_n$, each with k bits; i.e., $|\alpha_i| = |\beta_i| = k$, where $1 \le i \le n$.

2. Compute $\gamma = [G_b(\alpha_1) \oplus G_b(\alpha_2) \oplus \ldots \oplus G_b(\alpha_n)] \oplus [G_a(\beta_1) \oplus G_a(\beta_2) \oplus \ldots \oplus G_a(\beta_n)] \oplus A_{ab}$.

Thus, the garbled output for any gate in the circuit can be computed using the garbled table and the two garbled inputs to the gate. Note that while the construction of the garbled circuit requires interaction among all the n parties, $p_i$, $(1 \le i \le n)$, the server $p_e$ can perform the evaluation independently.

Secure and Verifiable Cloud Computing Through Secure Multiparty Computation

Below is highlight how to adapt the protocol of Goldreich 2004, Goldreich 1987 and the garbled circuit design of BMR [Beaver; Rogaway], in order to suit them for the secure cloud computing model. In an embodiment of the present invention, each server $p_i$, $(1 \le i \le n)$, generates shares of garbled values using cryptographically secure pseudorandom number generation method of Blum [see also in Schneier].

In a secure multiparty computation protocol, multiple parties hold private inputs, and receive the result of the computation. However, in the secure cloud computing system of the present invention, while multiple parties participate in the creation of garbled circuits, only the client holds private inputs and obtains the result of the computation in garbled form. Therefore, the protocols of Goldreich 2004, Goldreich 1987 and BMR [Beaver; Rogaway] are adapted in a number of ways, discussed below, to build an efficient, secure cloud computing system, that also enables the client to easily verify the outputs of the computation.

First, note that in the protocol of Goldreich 2004, Goldreich 1987, each party $p_i$ sends its share $(f(x_1, x_2, \ldots, x_n))_i$ to all the other parties. Using these shares, each party computes $f(x_1, x_2, \ldots, x_n)$ as $\oplus_{i=1}^{n} (f(x_1, x_2, \ldots, x_n))_i$. In embodiments of the secure cloud computing system, however, such embodiments require that each server $p_i$, $(1 \le i \le n)$, to send its share to only one server, $p_c$, which combines them using the XOR operation to produce entries such as $A_{ab}$ for each garbled table in the garbled circuit, GC.

Second, in the BMR protocol [Beaver; Rogaway], which is also a secure multiparty computation protocol, in addition to creating the garbled circuit, for evaluation, the n parties also create garbled inputs using secure multiparty computation. Then, each of these n parties evaluates the garbled circuit and obtains the result of the computation. In the system of the present invention, since only the client holds the inputs for the computation, it generates the corresponding garbled input for each input wire on its own using the seed values it sends to each server, $p_i$, ($1 \leq i \leq n$). Then, it sends these garbled values to server $p_e$ for evaluating the garbled circuit and obtains the result in garbled form. Note that in the present system model, only the server $p_e$ evaluates the garbled circuit, and that $p_e$ cannot interpret any garbled value, unless it colludes with all the n servers, $p_i$, ($1 \leq i \leq n$).

Third, in the BMR protocol [Beaver; Rogaway], the $\lambda$ value is set to zero for each output wire in the Boolean circuit. Therefore, each party evaluating the garbled circuit obtains the result of the computation in plaintext form from the LSB of the garbled output for each output wire in the circuit. In the present system, however, the $\lambda$ value for each output wire is also determined using the XOR-sum of the shares from all the n servers, $p_i$, ($1 \leq i \leq n$). As a consequence, result of the computation in plaintext form remains as secret for the evaluator $p_e$.

Fourth, in the protocol of Goldreich 2004, Goldreich 1987, each party splits and shares each of its private input bits with all the other parties over pairwise secure communication channels. In the present invention, this communication is eliminated using a unique seed value $s_{ik}$ that the client shares with all pairs of parties, ($p_i, p_k$), ($1 \leq i, k \leq n$). To split and share each of its m private input bits $x_{ij}$, ($1 \leq j \leq m$), party $p_i$ generates $r_{kj}$, ($\forall k \neq i$), using the seed value $s_{ik}$. More specifically, party $p_i$ sets its own share as $x_{ij} \oplus_{k=1, k \neq i}^{n} r_{kj}$, where $r_{kj} = R(s_{ik}, j, gate_{id}, entry_{id})$ corresponds to the output of the pseudorandom bit generator using the seed value $s_{ik}$ for the $j^{th}$ private input bit of party $p_i$, for a specific garbled table entry ($entry$)$_{id}$ of one of the gates ($gate$)$_{id}$ in the circuit. Likewise, party $p_k$ sets its own share as $r_{kj} = R(s_{ik}, j, gate_{id}, entry_{id})$. The total number of pseudorandom bits generated by each party for the protocol of Goldreich 2004, Goldreich 1987 equals $2(n-1) m \times 4 N_g = 8(n-1) m \times N_g$, where $m = (3+2(nk+1)+2k)$, and $N_g$ denotes the total number of gates in the circuit. In other words, the present invention eliminates the exchange of a very large number of bits ($O(n^3 k N_g)$ bits) between the n parties.

Fifth, the novel use of the Blum [see also in Schneier] pseudorandom number generator for generating garbled value shares enables the client to efficiently recover and verify the outputs of the computation. The client can detect a cheating evaluator, if it returns arbitrary values as output. This is presented in greater detail below.

Recovery and Verification of Outputs

The present method is presented to show how the client efficiently recovers the result of the delegated computation, as well as how the client verifies that the evaluator in fact carried out the computation.

This addresses the following questions. First, how does the client efficiently retrieve/recover the result of the computation without itself having to repeat the delegated computations? Second, how does the client verify that the evaluator, in fact, evaluated the garbled circuit? In other words, is it possible for the client to determine whether the evaluator returned arbitrary numbers without carrying out any computation at all, instead of the actual garbled output for each output wire?

The present invention enables the client to efficiently retrieve and verify the outputs returned by the evaluator, $p_e$. To achieve this, each of the n parties that participates in the creation of the garbled circuit uses the cryptographically secure pseudorandom number generator [Blum; see also in Schneier], as outlined below.

Let N denote the product of two large prime numbers, p, q, which are congruent to 3 mod 4. The client chooses a set of n seed values, $\{s_1, s_2, \ldots, s_n\}$, where each seed value $s_i$ belongs to $Z^*_N$, the set of integers relatively prime to N. The client sends the modulus value N and a unique seed value $s_i$ to each party $p_i$, ($1 \leq i \leq n$) over a secure communication channel. However, the client keeps the prime factors, p, q, of N as a secret.

Let $b_{i,j}$ denote the $j^{th}$ bit generated by the party $p_i$. Then, $b_{i,j} = \mathrm{LSB}(x_{i,j})$, where $x_{i,j} = x_{i,(j-1)}^2 \mod N$, and $x_{i,0} = s_i$.

Each wire $\omega$ in the circuit is associated with a pair of garbled values, ($\omega_0, \omega_1$), and a 1-bit $\lambda_\omega$ value. Then, $\omega_0 = \omega_{01} \| \omega_{02} \| \omega_{03} \| \ldots \| \omega_{0n}, 0, \omega_1 = \omega_{11} \| \omega_{12} \| \omega_{13} \| \ldots \| \omega_{1n}, 1$; and $\lambda_\omega = \lambda_{\omega 1} \oplus \lambda_{\omega 2} \oplus \lambda_{\omega 3} \oplus \ldots \oplus \lambda_{\omega n}$. In these three expressions, $\omega_{0i}$, $\omega_{1i}$ and $\lambda_{\omega i}$ are shares of the party $p_i$, ($1 \leq i \leq n$). Note that $|\omega_{0i}| = |\omega_{1i}| = k$, and $|\lambda_{\omega i}| = 1$.

For each wire $\omega$, ($0 \leq \omega \leq W-1$), in the circuit, each party, $p_i$, ($1 \leq i \leq n$), needs to generate ($2k+1$) pseudo random bits, where W denotes the total number of wires in the circuit. Thus, each party, $p_i$, generates a total of ($W(2k+1)$) pseudorandom bits.

Party $P_i$ generates its shares $\omega_{0i}, \omega_{1i}$, and $\lambda_{\omega i}$ for wire $\omega$ as a concatenation of the $b_{i,j}$ values, where the indices j belong to the range: [($\omega(2k+1)+1$), ($\omega+1)(2k+1)$]. For concise notation, let $\Omega_k = \omega(2k+1)$. Then, $$\omega_{0i} = b_{i,(\Omega_{\omega k}+1)} \| b_{i,(\Omega_{\omega k}+2)} \| \ldots \| b_{i,(\Omega_{\omega k}+k)},$$

$$\omega_{1i} = b_{i,(\Omega_{\omega k}+1)} \| b_{i,(\Omega_{\omega k}+2)} \| \ldots \| b_{i,(\Omega_{\omega k}+2k)},$$

$$\lambda_{\omega i} = b_{i,(\Omega_{\omega k}+2k+1)}.$$

Notice that each party $p_i$ is required to compute all the previous (j−1) bits before it can compute the $j^{th}$ bit. However, using its knowledge of the prime factors of N, i.e., p, q, the client can directly calculate any $x_{i,j}$ (hence, the bit $b_{i,j}$) using the relation: $x_{i,j} = x_{i,0}^{2^j \mod C(N)} \mod N$, where C(N) denotes the Carmichael function, which equals the least common multiple of (p−1) and (q−1).

Therefore, using the secret values p, q, the client can readily compute $\omega_0, \omega_1$, and $\lambda_\omega$ for any output wire w in the circuit; i.e., without having to compute $\omega_0, \omega_1$, and $\lambda_\omega$ for any intermediate wire in the circuit. Using the $\lambda_\omega$ values for the output wires, the client can translate each of the garbled values returned by the evaluator $p_e$ into a plaintext bit and recover the result of the requested computation. The client declares successful output verification only if the garbled output returned by the evaluator matches with either $\omega_0$, or $\omega_1$, for each output wire $\omega$ of the circuit.

Note that, without performing any computation, the evaluator can return one of the two actual garbled outputs for each output wire in the circuit, if and only if it colludes with all the n servers, $\{p_1, p_2, \ldots, p_n\}$, that participated in the creation of the garbled circuit, or factorizes N into its prime factors, p and q, which is infeasible.

Further, the pseudorandom number generator [Blum; see also in Schneier] guarantees that one cannot predict the next/previous bit output from the generator, even with the knowledge of all the previous/future bits. Thus, based on the observations of the garbled values during evaluation, the evaluator cannot predict the preceding or subsequent garbled values, or the $\lambda$ values for any wire in the circuit.

Summary of Secure Cloud Computing System

A summary of the secure cloud computing system is as follows.

1. The client chooses a set of (n+2) servers in the cloud, $\{p_1, p_2, \ldots, p_n, p_c, p_e\}$. Then, it provides a description of the desired computation, and a unique seed value $s_i$ to each server $p_i$, ($1 \leq i \leq n$). It also provides another seed value $s_{ik}$ to each pair of servers, ($p_i, p_k$), ($1 \leq i, k \leq n$).

2. Each server, $p_i$, ($1 \leq i \leq n$), creates (or retrieves from its repository, if already available) a Boolean circuit (B) that corresponds to the requested computation.

3. Each server, $p_i$, ($1 \leq i \leq n$), uses $s_i$ to generate its shares for the pair of garbled values and a λ value for each wire in the circuit (B) using the pseudo random generator of Blum [see also in Schneier].

Using seed $s_i$, each server, $p_i$, generates a pseudorandom bit sequence whose length equals $W(2\ k+1)$, where W denotes the total number of wires in the Boolean circuit (B).

4. The client instructs the n servers, $p_i$, ($1 \leq i \leq n$), to use their shares as private inputs for the secure multiparty computation protocol of Goldreich, to construct shares ($GC_i$) of a BMR garbled circuit, GC.

While using the protocol of Goldreich, each pair of servers, $(p_i, p_k)$, ($1 \leq i, k \leq n$), generates pseudorandom bits using pairwise seed values $s_{ik}$.

Let $A_i = (A_{00})_i \| (A_{01})_i \| (A_{10})_i \| (A_{11})_i$ denote the shares of server $p_i$ for the four garbled table entries of gate A. Then, $GC_i$, in turn, is a concatenation of all bit strings of the form $A_i$, where the concatenation is taken over all the gates in the circuit.

5. The client instructs all the n servers, $p_i$, ($1 \leq i \leq n$) to send their shares $GC_i$ to the server $p_c$. Performing only XOR operations, the server $p_c$ creates the desired circuit, $GC = GC_1 \oplus GC_2 \oplus \ldots \oplus GC_n$. Now, the client instructs the server $p_c$ to send the garbled circuit GC to server $p_e$ for evaluation.

6. Using the unique seed values $s_i$, ($1 \leq i \leq n$), the client generates garbled input values for each input wire in the circuit, and sends them to the server $p_e$ for evaluation. Using these seed values, the client also generates the λ values and the two possible garbled values for each output wire in the circuit, and keeps them secret.

7. Using the garbled inputs, the server $p_e$ evaluates GC, and obtains the garbled outputs for each output wire in the circuit and sends them to the client. Using the λ values, the client now translates these garbled values into plaintext bits to recover the result of the requested computation.

8. The client checks whether the garbled output for each output wire in the circuit that is returned by the evaluator, $p_e$, matches with one of the two possible garbled values that it computed on its own. If there is a match for all output wires, then the client declares that the evaluator in fact carried out the requested computation.

Complexity

Circuit Size of One Garbled Table Entry

The size of the Boolean circuit (B') that computes one specific entry ($A_{ab}$) in the garbled table has been analyzed. Assume that each gate takes two input bits to produce one output bit. Recall from above (Construction of the garbled circuit, GC) that $A_{ab} = \gamma_{[(\lambda_x \oplus a) \otimes (\lambda_y \oplus b) \oplus \lambda_z]} \oplus [G_b(a_{a1}) \oplus G_b(a_{a2}) \oplus \ldots G_b(a_{an})] \oplus [G_a(\beta_{b1}) \oplus G_a(\beta_{b2}) \oplus \ldots \oplus G_a(\beta_{bn})]$, where $\otimes \in \{XOR, AND\}$ denotes the binary operation of gate A.

Let $s = ((\lambda_x \oplus a) \otimes (\lambda_y \oplus b)) \oplus \lambda_z$. Computing s requires a total of $3+3(n-1)=3n$ XOR gates and $1 \otimes$ gate, since $\lambda_x = \oplus_{i=1}^n \lambda_{xi}, \lambda_y = \oplus_{i=1}^n \lambda_{yi}, \lambda_z = \oplus_{i=1}^n \lambda_{zi}$, where $\lambda_{xi}, \lambda_{yi}, \lambda_{zi}$ are shares of server $p_i$, ($1 \leq i \leq n$).

Boolean circuit B' includes a multiplexer that chooses $\gamma_s$ using the expression, $\gamma_s = ((\gamma_0 \oplus \gamma_1) \cdot s) \oplus \gamma_0$. This expression is composed of 2 XOR gates and 1 AND gate. Since $|\gamma_0| = |\gamma_1| = nk+1$, and $LSB(\gamma_s) = s$, multiplexing is performed on the most significant nk bits. This multiplexer can be built using a total of 2 nk XOR gates and nk AND gates.

Now, the expression $\gamma_s \oplus [G_b(\alpha_{a1}) \oplus G_b(a_{a2}) \oplus \ldots \oplus G_b(a_{an})] \oplus [G_a(\beta_{b1}) \oplus G_a(\beta_{b2}) \oplus \ldots \oplus G_a(\beta_{bn})]$ has $(2n+1)$ terms, which are combined using 2n XOR operations. Since, each term has a length of $(nk+1)$ bits, computing this expression requires a total of $2n(nk+1)$ XOR gates.

To summarize, the Boolean circuit (B') that computes one specific garbled table entry ($A_{ab}$) has a total of $(3n+2nk+2n(nk+1))$ XOR gates, nk AND gates, and $1 \otimes$ gate.

Figure 3:
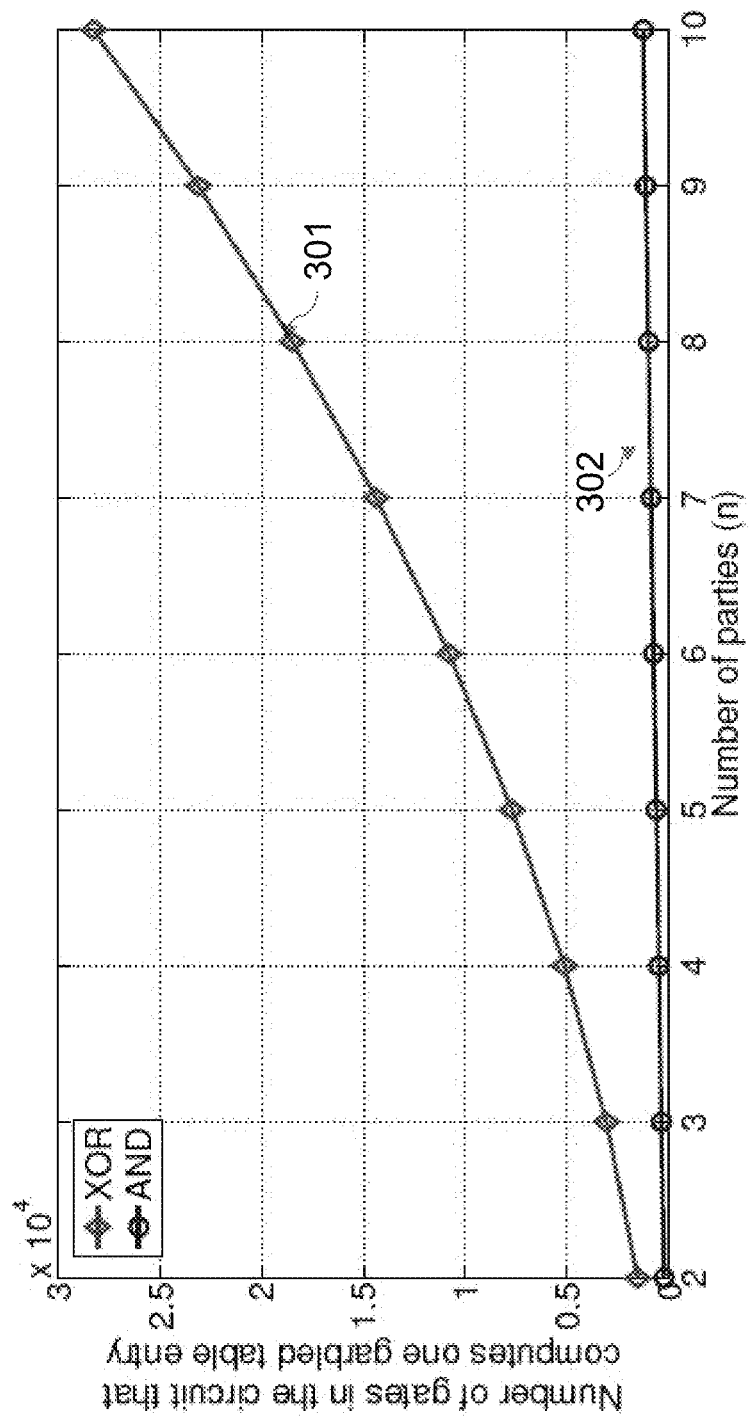
FIG. 3 depicts a graph showing the number of gates in the circuit that computes one garbled table entry as a function of the number of parties (n).

FIG. 3 shows the total number of gates in the circuit that computes $A_{ab}$, when A is an AND gate, as a function of n or a fixed value of k=128 bits. Notice the relatively small number of AND gates in the circuit. For example, when n=6, the circuit that computes $A_{ab}$ has a total of 10782 XOR and 769 AND gates. While the number of XOR gates increases quadratically with n, the number of AND gates increases only linearly with n.

Let B denote the Boolean circuit that corresponds to the desired computation such as addition of two numbers. Then, while creating the garbled circuit GC for B, the n parties use the circuit B' for the protocol of Goldreich to compute each one of the four garbled table entries of the form $A_{ab}$ for each gate A in the circuit B.

Communication Cost to Compute One Garbled Table Entry

A 1-out-of-2 OT exchange between two parties involves the exchange of: (i) a random element C from the prime order subgroup, G, of $Z^*_p$; (ii) a public key, $PK_0$; and (iii) the encryptions, $E_0$, $E_1$, of the plaintext messages $M_0$, $M_1$. Let k denote the security parameter, which equals the size of the plaintext messages, $M_0$, $M_1$. Let $s_{1:2}$ denote the total number of bits that are exchanged during a 1-out-of-2 OT. Then, $s_{1:2} = |C| + |PK_0| + |E_0| + |E_1| = |p| + |p| + (|p|+k) + (|p|+k) = 4|p| + 2\ k$.

A 1-out-of-4 OT exchange between two parties includes: (i) two 1-out-of-2 OTs, and (ii) four encryptions, $E_{00}$, $E_{01}$, $E_{10}$, $E_{11}$. Let $s_{1:4}$ denote the total number of bits that are exchanged during a 1-out-of-4 OT. Then, $s_{1:4} = 2(s_{1:2}) + 4\ k = 8(|p|+k)$. Note that $|p|$ and k are public and symmetric key security parameters, respectively. For example, $|p|=3072$ achieves the equivalent of k=128-bit security [2]; in this case, the sum of the sizes of all messages exchanged during a 1-out-of-4 OT is $s_{1:4}=3200$ bytes.

For each AND gate in the circuit B', all possible pairs of the n servers, $(p_i, p_j)$, $1 \leq i < j \leq n$, engage in a 1-out-of-4 OT, and there are a total of $n(n-1)/2$ combinations of $(p_i, p_j)$. Since the number of AND gates in the circuit B' is at most $(nk+1)$, the total number of 1-out-of-4 OTs is $t_{1:4} = (nk+1) \times n(n-1)/2$.

At the completion of the secure multiparty computation protocol of Goldreich, each server, $p_i$, ($\leq i \leq n$), sends its share $(A_{ab})_i$ to another server, $p_c$, to create the desired garbled table entry, $A_{ab}$. Since $|(A_{ab})_i| = nk+1|$, the server $p_c$ receives a total of $s^* = n(nk+1)$ bits from the other n servers.

To summarize, in order to create one entry, $A_{ab}$, the total amount of network traffic, $T = (t_{1:4} \times s_{1:4}) + s^* = (nk+1)[(4(|p|+k) \times n(n-1)) + n]$. When the security parameters, k and $|p|$, are fixed, the network traffic is a cubic function of n.

Figure 4:
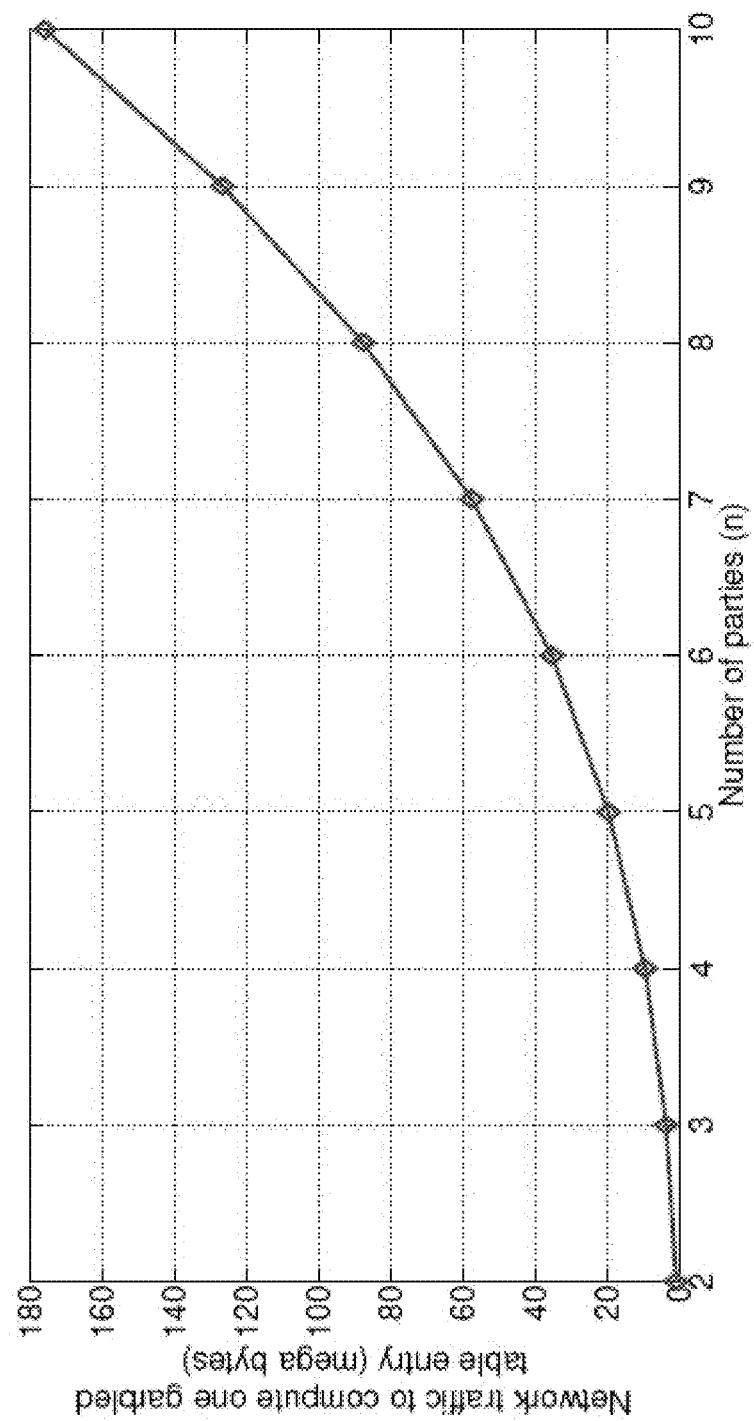
FIG. 4 depicts a graph showing the amount of network traffic to compute one garbled table entry as a function of the number of parties (n).

FIG. 4 shows the network traffic to create one garbled table entry as a function of n. For example, when n=5, the cloud servers exchange a total of 19.56 MB of data in order to create a single entry in the garbled table.

Let $N_g$ denote the total number of gates in the circuit B that corresponds to the desired computation. Then, in the process of creating the garbled circuit, GC, the total amount of network traffic equals $4N_g \times T$.

Computation Cost of Creating the Garbled Circuit

Let W denote the total number of wires in the circuit B. For each wire, each server, $p_i$, ($1 \leq i \leq n$), generates $(2\ k+1)$ bits using the Blum, Blum, Shub (BBS) pseudorandom number generator (PRNG) for its share of garbled values and the λ value. Therefore, the n servers collectively generate a total of $b_1=n(2k+1)W$ bits using the BBS PRNG. Let N denote the modulus value in BBS PRNG (note: $|N|=3072$ achieves 128-bit security [Barker]). Then, $n(2k+1)W$ modular multiplication operations in $Z^*_N$ are necessary to generate bits using BBS PRNG.

Let $W_0$ denote the number of output wires in the circuit B. Let G denote the PRNG, which is described above, that outputs a sequence of $(2nk+2)$ bits on providing a k-bit input seed. Each server uses the PRNG G, on its share of each garbled value for every non-output wire in the circuit B. Then, in the process of creating the garbled circuit, the n servers collectively use the PRNG G, $2n(W-W_0)$ times to generate a total of $b_2=4n(nk+1)(W-W_0)$ bits.

Let $N_g$ denote the total number of gates in the circuit B. For the protocol of Goldreich, the total number of pseudo-random bits generated by each party using the PRNG R, equals $8(n-1)m \times N_g$, where $m=(3+2(nk+1)+2k)$. Thus, the n parties collectively generate a total of $b_3=8n(n-1)(3+2(nk+1)+2k) \times N_g$ bits using the PRNG R.

Note that both the PRNG G and PRNG R can be realized using a block cipher such as AES operating in output feedback mode.

Let $t_{1:4}$ denote the number of 1-out-of-4 OTs to create one garbled table entry. Then, the total number of 1-out-of-4 OTs to create the complete garbled circuit GC is at most $4N_g \times t_{1:4}=4N_g \times (nk+1) \times n(n-1)/2$.

During a 1-out-of-2 oblivious transfer, the sender and chooser generate a total of $|C|+|k|+|r_0|+|r_1|=(4|p|-1)$ bits. Each 1-out-of-4 oblivious transfer involves the cost of two 1-out-of-2 oblivious transfers, in addition to generating a total of $|L_0|+|L_1|+|R_0|+|R_1|=4k$ bits. A very small constant number of modular arithmetic operations, AES and SHA crypto operations are carried out during each OT. While creating the garbled circuit GC, these sets of operations are performed $4N_g \times (nk+1) \times n(n-1)/2$ times; and a total of $b_4=4N_g \times (nk+1) \times (n(n-1)/2) \times (8|p|+4k-2)$ bits are generated during the OTs.

To summarize, the total number of bits that are generated by the n parties while creating the garbled circuit is $b=b_1+b_2+b_3+b_4=(n(2k+1)W)+(4n(nk+1)(W-W_0))+(8n(n-1)(3+2(nk+1)+2k) \times N_g)+(4N_g \times (nk+1) \times (n(n-1)/2) \times (8|p|+4k-2))$. Thus, for any given Boolean circuit, when the security parameters k and $|p|$ are fixed, the total number of bits generated randomly is a cubic function of n.

Figure 5:
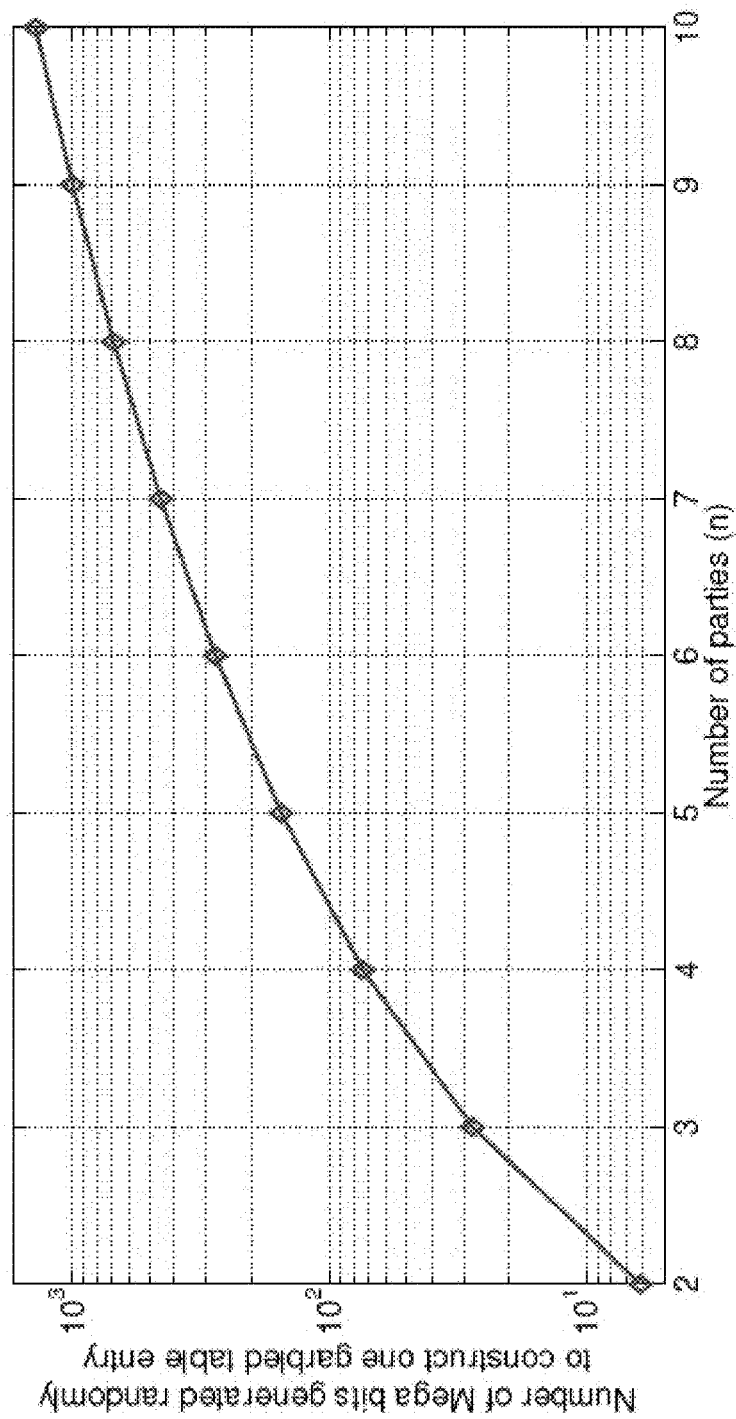
FIG. 5 depicts a graph showing the total number of Mega bits that are generated randomly in a process of creating one garbled table entry for a 32-bit adder.

For example, consider the construction of a garbled circuit for adding two 32-bit numbers. The corresponding Boolean circuit has a total of $W=439$ wires, $W_0=33$ output wires, and $N_g=375$ gates. [The 32-bit adder circuit in [Tillich] has 127 AND gates, 61 XOR gates, and 187 NOT gates]. Note that a NOT gate is equivalent to an XOR gate, since $NOT(x)=1 \oplus x$.] FIG. 5 shows the total number of Mbits that are generated randomly while creating one garbled table entry (i.e., $b/(4N_g \times 2^{20})$) for the 32-bit adder. As an example, when $n=5$, these parties collectively generate a total of 153.41 Mbits, randomly, to create one garbled table entry.

Cost of Evaluating the Garbled Circuit

In order to perform the requested computation, the server $p_e$ obtains the garbled circuit, GC, from the server $p_c$. Let $N_g$ denote the total number of gates in the circuit B. Each entry in the garbled table has a length of $(nk+1)$ bits. Therefore, the size of the garbled circuit equals $4N_g \times (nk+1)$ bits.

Figure 6:
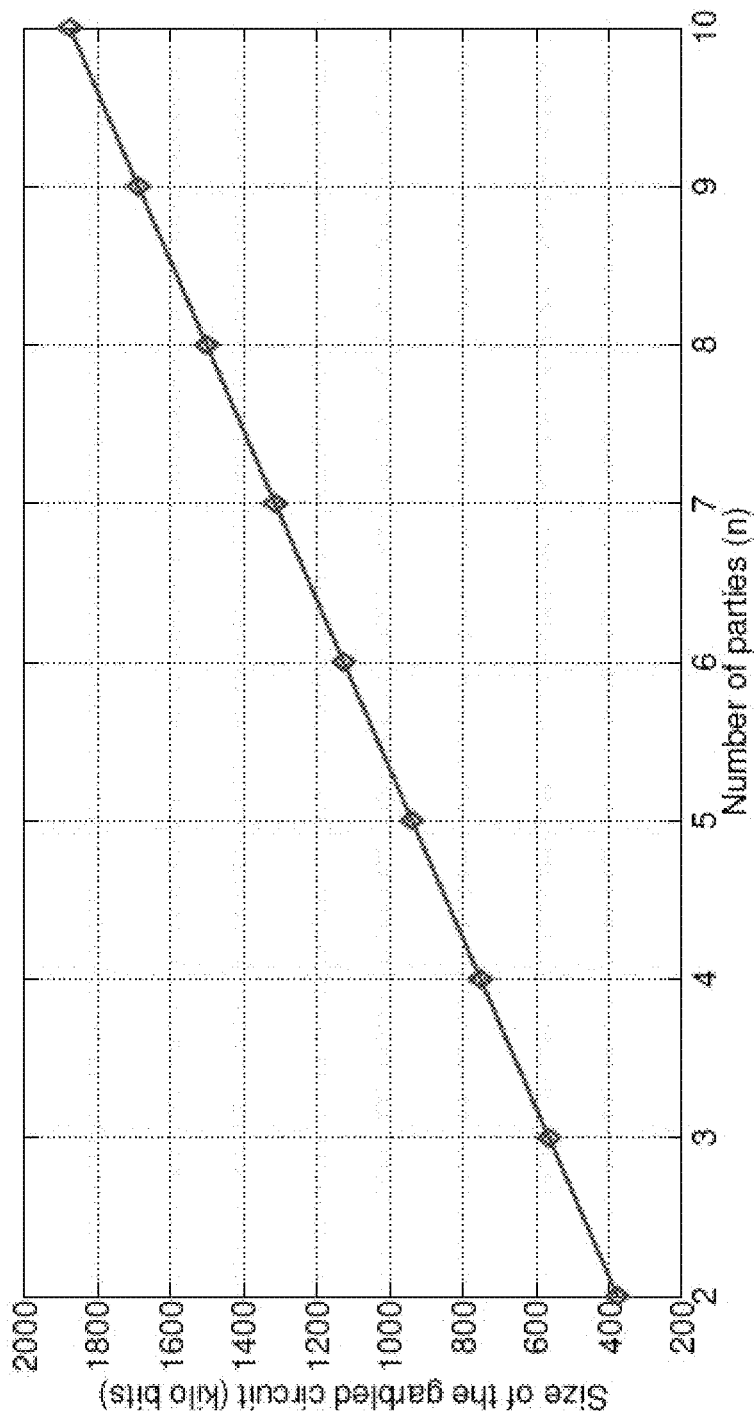
FIG. 6 depicts a graph showing the size of a garbled circuit in kilo bits for a 32-bit adder.

FIG. 6 shows the size of the garbled circuit in kilo bits for the 32-bit adder. This circuit has $N_g=375$ gates. The security parameter $k=128$.

Let W and $W_0$ denote the total number of wires and output wires, respectively, in the Boolean circuit B. During evaluation, for each non-output wire of the circuit, the server $p_e$ uses the PRNG G n times. Therefore, G is used for a total of $(W-W_0)n$ times.

Cost for the Client

To enable the creation of the garbled circuit, the client provides: (i) a unique seed value, $s_i$, to each server $p_i$, ($1 \leq i \leq n$), and (ii) a seed value, $s_{ik}$, to each pair of servers $(p_i, p_k)$, ($1 \leq i, k \leq n$).

For the BBS PRNG, the length of each seed value, $|s_i|=|N|$. For the PRNG R, which can be implemented using a block cipher such as AES in output feedback mode, the length of each seed is $|s_{ik}|=k$. Therefore, the total number of bits that the client generates to provide the seed values is $b_s=n|N|+n(n-1)k=n(|N|+(n-1)k)$.

For each plaintext input bit to the circuit, the client is required to generate the garbled input. Each garbled value is $(nk+1)$ bits long, whose least significant bit depends on the $\lambda$ value. Since the $\lambda$ value, in turn, depends on the 1-bit shares for the n parties, the number of bits that the client needs to generate for each input wire equals $b_i=(nk+n)$.

To enable verification of outputs, the client needs to generate both possible garbled outputs for each output wire. Therefore, the number of bits that the client needs to generate for each output wire equals $b_0=(2nk+n)$.

To summarize, the client generates a total of $b_s+W_i \times b_i+W_0 \times b_0=n[|N|+(n-1)k+W_i(k+1)+W_0(2k+1)]$ bits, where $W_i$ and $W_0$ denote the number of input and output wires, respectively, in the Boolean circuit B.

Figure 7:
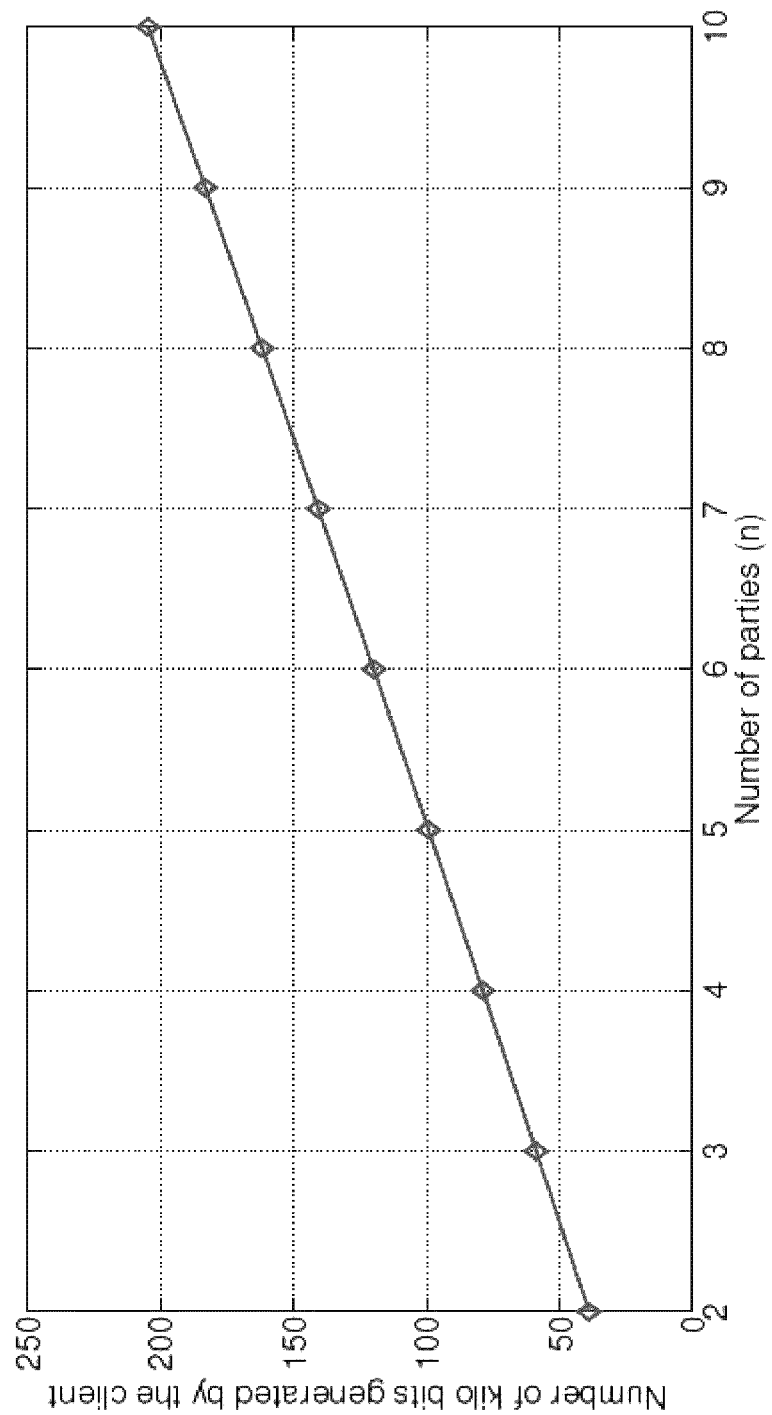
FIG. 7 depicts a graph showing the total number of kilo bits that a client generates to delegate the construction and evaluation of the garbled circuit, and to verify the outputs for an 32-bit adder.

FIG. 7 shows the total number of kilo bits that the client generates in order to enable the servers to construct and evaluate the garbled circuit, as well as for the verification of outputs for the 32-bit adder. This circuit has $W_i=64$ input wires and $W_0=33$ output wires. The security parameters are $k=128$ and $|N|=3072$.

Comparing FIG. 7 with FIGS. 4-5, it is noticed that while the servers generate and exchange Gigabytes of information to create the garbled circuit, the mobile client, on the other hand, generates and exchanges only kilobytes of information with the evaluator and the other servers.

Comparison with Gentry's FHE scheme: While Gentry's FHE scheme uses only one server, it, however, requires the client to exchange $O(k^5)$ bits with the evaluating server, for each input and output wire of the circuit. In the secure cloud computing system, since each garbled value has a length of $(nk+1)$ bits, for each input and output wire, the client only exchanges $O(nk)$ bits with the server $p_e$. For example, with $k=128$, the size of each encrypted plain text bit equals several Gigabits with Gentry's scheme, while it equals a mere 641 bits in the approach of the present invention with $n=5$. Thus, the approach of the present invention is far more practical for cloud computing in mobile systems in comparison to FHE schemes.

Construction and Evaluation Time

Figure 8:
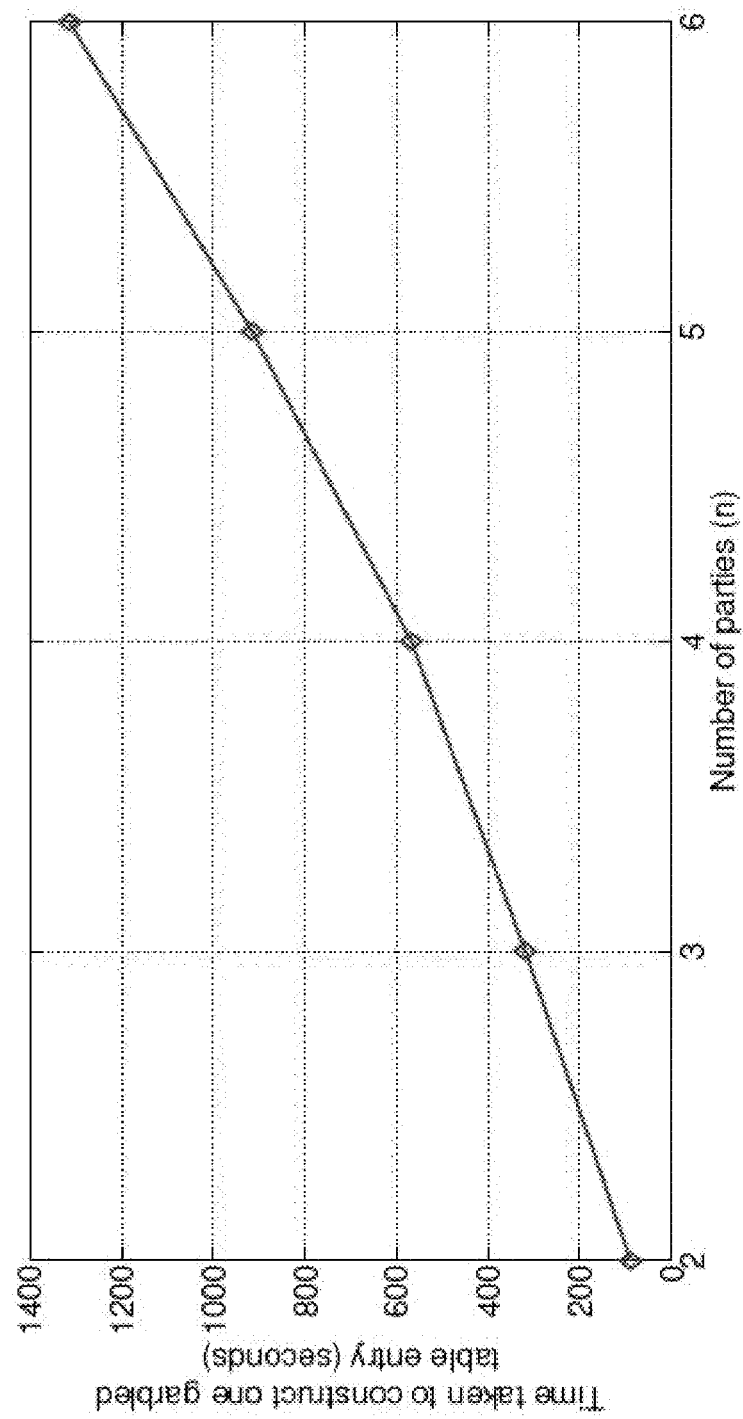
FIG. 8 depicts a graph showing the time taken to construct one garbled table entity.

The secure cloud computing system was implemented using BIGNUM routines and crypto functions from the OpenSSL library. The system was built as a collection of modules, and the servers communicate using TCP sockets. The system was evaluated on a server with Intel Xeon 2.53 GHz processor, with 6 cores and 32 GB RAM. FIG. 8 shows the time taken to construct one garbled table entry for the 32-bit adder as a function of n. It is noted that entries can be constructed in parallel, significantly reducing construction time.

Figure 9:
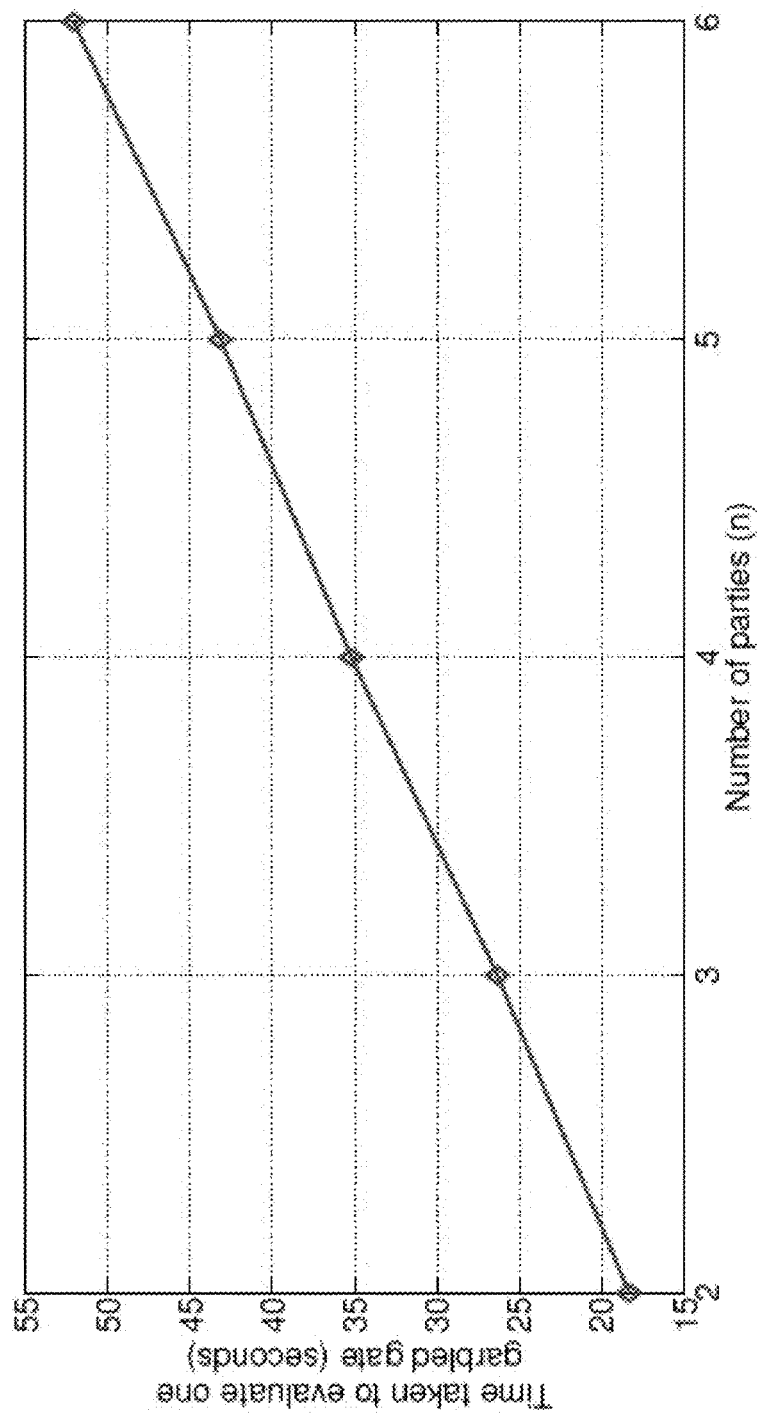
FIG. 9 depicts a graph showing the time to evaluate on garbled gate.

FIG. 9 shows the time taken to evaluate one garbled gate for the 32-bit adder as a function of n. Comparing FIG. 8 and FIG. 9, it is observed that evaluation is significantly faster than construction, where the latter can be done offline.

Privacy Preserving Application: Closets Bank/ATM Location

The following privacy preserving application was examined. A mobile client, which is located at the intersection of two streets, needs to determine the location of the closest Chase or Wells Fargo bank or ATM machine in a privacy preserving manner. This privacy preserving application was evaluated using real-world data available for Salt Lake City, Utah, whose streets are arranged in a grid pattern. This privacy preserving application of the present invention assures the privacy of the following (i) the mobile client's input location, (ii) the computed bank/ATM location closest to the client, and (iii) the computed distance to the closest ATM. Note that these secret are revealed to the evaluator only if it colludes with all the n servers that participate in the creation of the garbled circuit.

TABLE 2

(Locations of Banks and ATMs in Salt Lake City, UT)

| Bank/ATM | Location |
|---|---|
| Chase | 201 South 0 east |
| Chase | 185 South 100 East |
| Chase | 376 East 400 South |
| Chase | 531 East 400 South |
| Wells Fargo | 299 South 0 East |
| Wells Fargo | 381 East 300 South |
| Wells Fargo | 79 South 0 East |
| Wells Fargo | 778 South 0 East |
| Wells Fargo | 570 South 700 East |
| Wells Fargo | 235 South 1300 East |

(source: www.chase.com, www.wellsfargo.com).

An area of Salt Lake City, Utah was considered that lies between Main street (which represents 0 East street), 1300 East street, South Temple street (which represents 0 South street), and 800 South street. This area consists of L=10 ATM locations that are shown in Table 2. Each East/South coordinate in this area is an l=max([$\log_2$ 1300], [$\log_2$ 800])=11-bit unsigned number. Therefore, the location of the mobile client at an intersection, or any bank/ATM in this area can be identified using $L_{ind}$=2 l=22 bits.

Circuit for Computing Manhattan Distance

Let $(x_a, y_a)$ represent the coordinates of the mobile client at an intersection. Similarly, let $(x_b, y_b)$ represent the coordinates of a bank/ATM. Since the streets are arranged in a grid pattern, the shortest distance (D) between $(x_a, y_a)$ and $(x_b, y_b)$ equals the sum of the absolute differences between the respective coordinates: $D=|x_a-x_b|+|y_a-y_b|$. This distance metric is more commonly referred to as the Manhattan distance.

Figure 10:
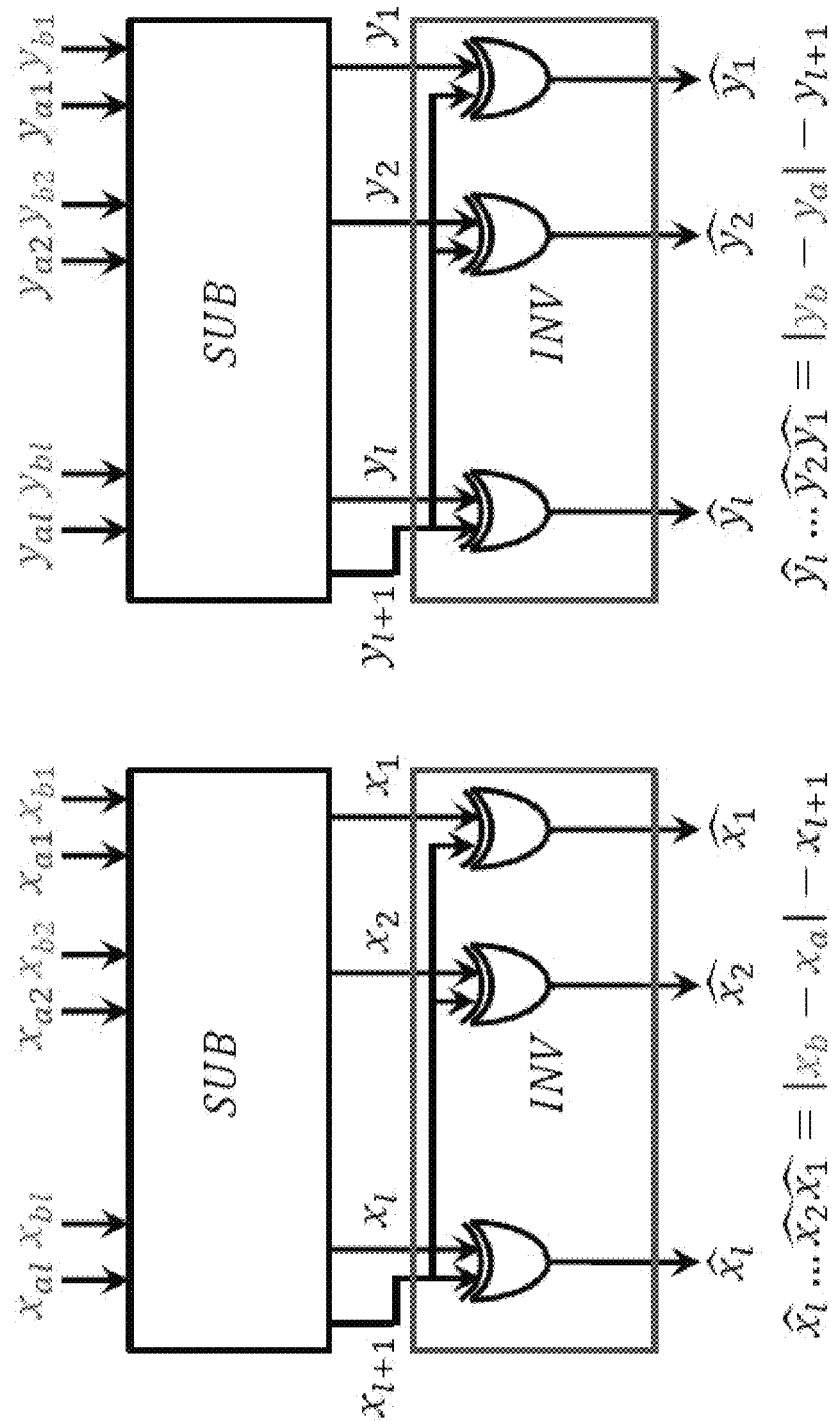
FIG. 10 depicts a block diagram of a circuit showing the absolute difference between the X and Y coordinates.
Figure 11:
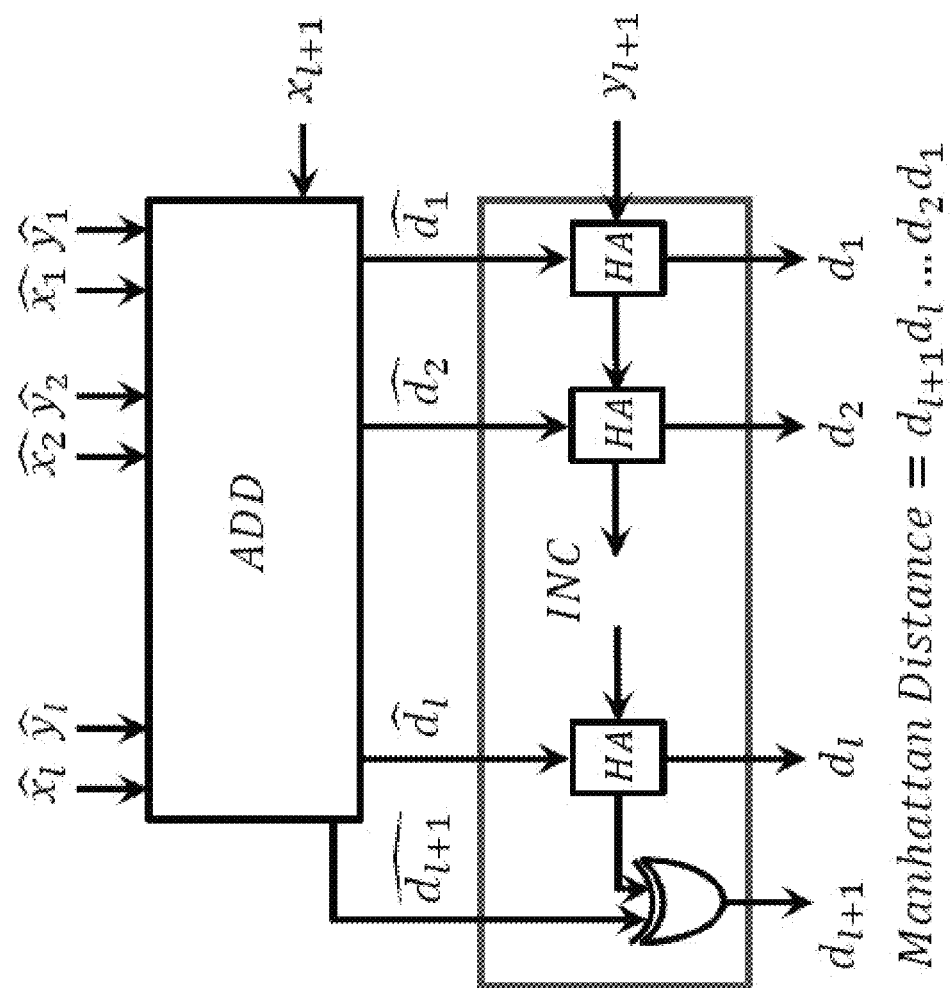
FIG. 11 depicts a block diagram of a circuit showing Manhattan distance computation.

A Boolean circuit was designed for computing the Manhattan distance between two points, $(x_a, y_a)$ and $(x_b, y_b)$. Assume that each coordinate is an l-bit unsigned number. FIG. 10 and FIG. 11 show the block diagram of the circuit. The SUB and ADD blocks of Kolesnikov were used.

Each SUB/ADD block is composed of l 1-bit subtractors/adders; each 1-bit subtractor/adder, in turn, is composed of 4 XOR gates, 1 AND gate. Note that $(l+1)^{th}$ output bit of SUB block equals the complement of carry-out bit from the $l^{th}$ 1-bit subtractor.

If $x_a > x_b$, then the output of SUB block equals the absolute difference, $|x_a-x_b|$. Otherwise, the output of SUB block equals the negative value, $-|x_a-x_b|$, in 2's complement form. Since $x_{l+1}=1$ for negative values, $x_{l+1}$ is used as one of the inputs for the XOR gates in the INV block to compute the 1s complement of the absolute difference. Then, $x_{l+1}$ is subsequently used as a carry-in input bit for the ADD block. Thus, the output of the ADD block accounts for both $x_a > x_b$ and $x_a \leq x_b$ cases.

Similarly, for the Y coordinates, the SUB and INV blocks are used to compute the absolute difference in 1's complement form. To account for the case when $y_{l+1}=1$, an INC block is used that adds the value of the bit $y_{l+1}$ to the output of the ADD block. The INC block is composed of 1 half-adder(HA) blocks, where each HA block, in turn, is composed of 1 XOR and 1 AND gate.

The output of the INC block represents the (l+1)-bit Manhattan distance between $(x_a, y_a)$ and $(x_b, y_b)$. Using the circuit design of FIGS. 10-11, a list of distances between the location of the mobile client and any number (L) of ATM locations can be computed. Table 3 shows that the Boolean circuit for computing the Manhattan distance between two points has a total of (15 l+1) XOR gates and 4 l AND gates.

It should be noted that, in a more direct alternative to compute Manhattan distance, one may first find $\min(x_a, x_b)$ and max $(x_a, x_b)$, and always subtract $\min(x_a, x_b)$ from max $(x_a, x_b)$ (similarly for the Y coordinates). While this approach would eliminate INV and INC blocks, it however would require the use of two comparator and conditional swap blocks [Huang], which together introduce 12 l new XOR gates and 4 l AND gates. Consequently, this alternative approach to compute Manhattan distance would require a total of 24 l XOR gates and 7 l AND gates. Thus, in comparison to this more direct alternative, the design shown above in FIGS. 10-11 requires a significantly smaller number of (15 l+1) XOR and 4 l AND gates.

TABLE 3

Circuit size for Manhattan distance calculations

| Block | #XOR gates | #AND gates |
|---|---|---|
| 2 × SUB | 2 × 4l | 2 × l |
| 2 × INV | 2 × l | 0 |
| ADD | 4l | l |
| INC | l + 1 | l |
| Total | 15l + 1 | 4l |

Circuit for Computing Closest ATM

Figure 12:
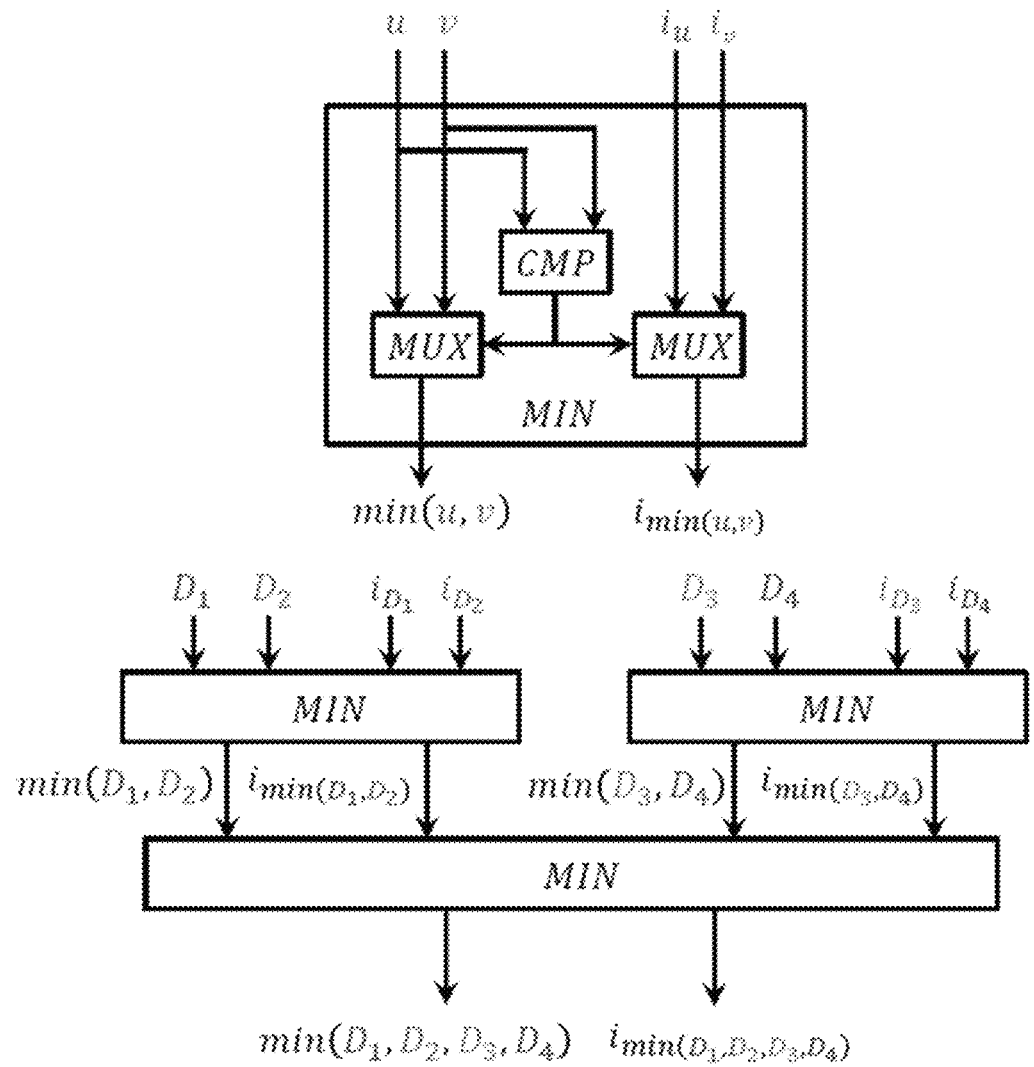
FIG. 12 depicts a block diagram of finding minimum value and index.

Following the computation of distance between the mobile client and L ATM locations, it is necessary to find the closest ATM, along with its distance. The approach of Kolesnikov was used to find the minimum value and its index, given a list of values. Kolesnikov designed a MIN block to find the minimum of two input values it uses the result of a comparator to multiplex the minimum value, as well as the corresponding index as shown in FIG. 12. Table 4 shows the size of the circuit that computes the minimum of two values, along with its index. In the privacy preserving application, each distance is an (l+1)=11+1=12-bit number, and each index that identifies an ATM using its East and South coordinates is an $L_{ind}$=2 l=22-bit numbers.

TABLE 4

Circuit size of 1 Min block

| Block | #XOR gates | #AND gates |
|---|---|---|
| CMP | $3(l + 1)$ | $l + 1$ |
| $MUX_{min}$ | $2(l + 1)$ | $l + 1$ |
| $MUX_{index}$ | $2L_{ind}$ | $L_{ind}$ |
| Total | $5(l + 1) + 2L_{ind}$ | $2(l + 1) + L_{ind}$ |

Given L values and their indices, using (L−1) MIN blocks organized as a tree, the minimum value and the corresponding index are propagated from the leaves to the root. FIG. 12 shows the computation of the minimum of 4 input values, $D_1$, $D_2$, $D_3$, $D_4$, and the corresponding index, $i_{min}$ ($D_1$, $D_2$, $D_3$, $D_4$), as an example.

Table 5 shows the number of XOR and AND gates in the complete circuit that computes the closest ATM location. It shows that in the privacy preserving application of finding the closest Chase or Wells Fargo ATM in Salt Lake City, the circuit has a total of 2596 XOR and 854 AND gates.

TABLE 5

Complete circuit size for closest ATM. DIST(L) denotes distance to L locations. T(MIN) denotes the tree of MIN blocks

| Block | #XOR gates | #AND gates |
|---|---|---|
| DIST(L) | $v_1 = (15l + 1)L$ | $v_3 = 4lL$ |
| T(MIN) | $v_2 = [5(l + 1) + 2L_{ind}] \times (L - 1)$ | $v_4 = [2(l + 1) + L_{ind}] \times (L - 1)$ |
| Total | $v_1 + v_2$ | $v_3 + v_4$ |
| Application | 2596 | 854 |

Server-side and Client-side Cost

Figure 13:
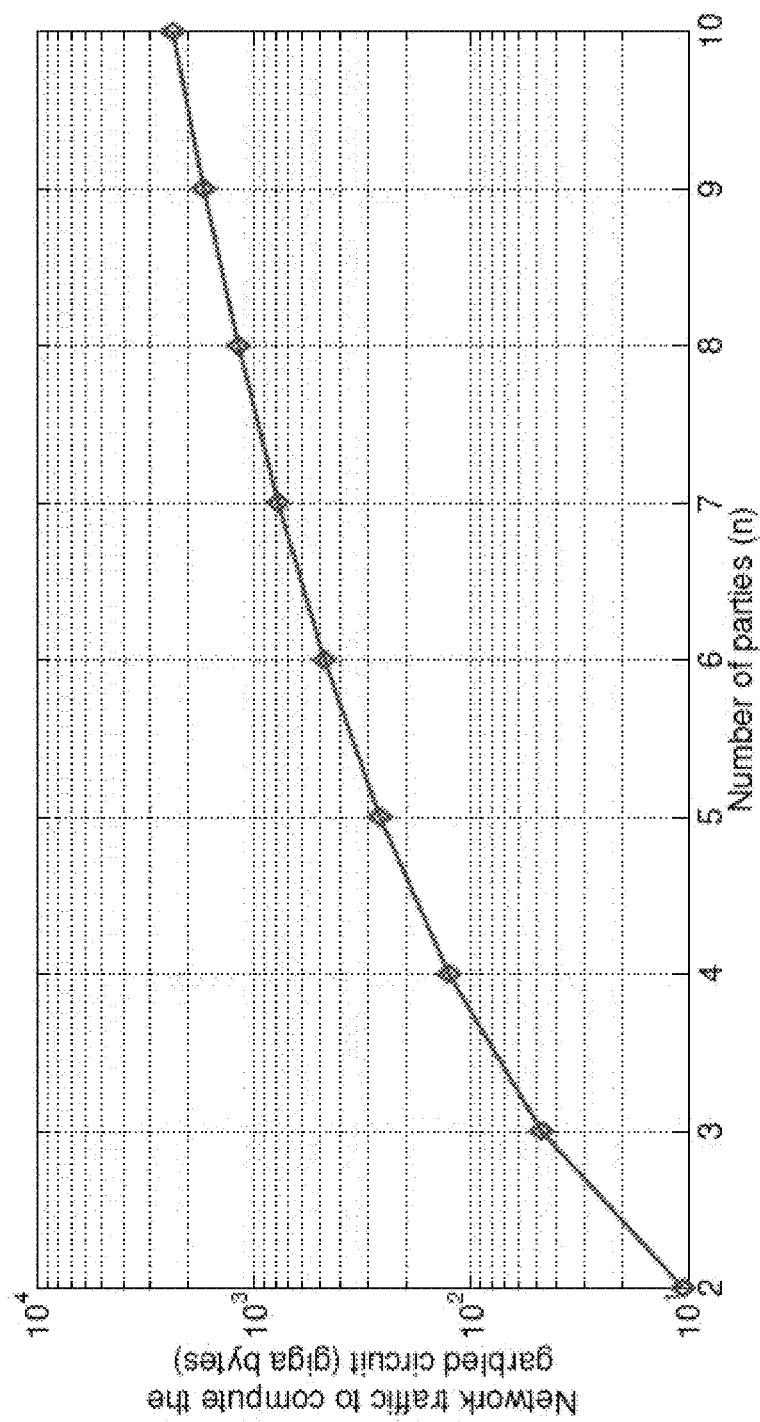
FIG. 13 depicts a graph showing the server-side network traffic to construct the garbled circuit for determining the closest ATM.

FIG. 13 shows the network traffic as a function of the number of servers (n) involved in the creation of the garbled circuit that can compute the closest ATM and the corresponding distance in a privacy preserving manner. For example, with n=4 servers, the servers exchange a total of 126 GB of information to create the garbled circuit. This result demonstrates the feasibility of the approach of the present invention for performing real-world privacy-preserving computations.

In order to facilitate the creation of the garbled circuit, and for the evaluation, the mobile client sends—(i) the seed values to the n servers, and (ii) the garbled values representing the coordinates of an intersection to the evaluator. Since the ATM locations are publicly known, they are assumed to be hard-coded in the garbled circuit. i.e., client is not required to transmit the ATM locations to the servers.

Figure 14:
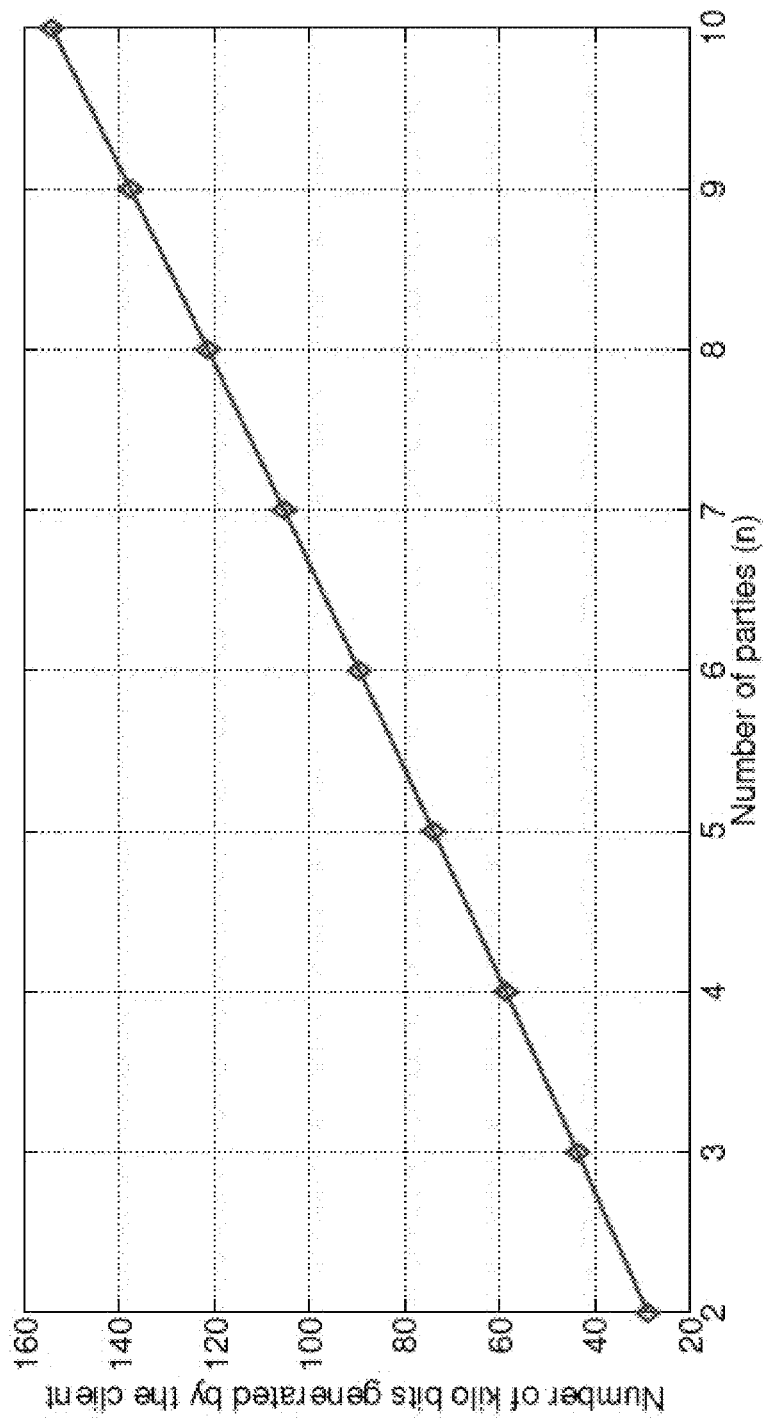
FIG. 14 depicts a graph showing the client-side cost to determine the closest ATM.

FIG. 14 shows the total number of bits generated by the client to delegate the privacy preserving computation of the closest ATM. To preserve location privacy, client exchanges a very small amount of information with the servers less than 60 kilo bits, with n=4 servers, for example. Comparing FIG. 13 and FIG. 14, it is noted that the client-side cost grows much slowly with the number of servers, in comparison to the server-side cost.

System and Method

Accordingly a novel secure and verifiable cloud computing for mobile system using multiple servers has been discovered. The method of the present invention combines the secure multiparty computation protocol of Goldreich 2004; Goldreich 1987 and the garbled circuit design of Beaver with the cryptographically secure pseudorandom number generation method of Blum. The present method preserves the privacy of the mobile client's inputs and the results of the computation, even if the evaluator colludes with all but one of the servers that participated in the creation of the garbled circuit. Further, the present method can efficiently detect a cheating evaluator that returns arbitrary values as output without performing any computation. A comprehensive analysis of the computational and communication complexity was presented for the server side and the client side. The time taken to construct and evaluate entries in a garbled table for varying number of servers was also evaluated. While construction incurs a significant delay, precomputation of garbled circuits can drastically reduce the response time for any computation request from the mobile client.

In an embodiment of the present, an example of a listing of steps is as follows:

A. The client chooses a set of (n+2) servers in the cloud, $\{p_1, p_2, \ldots, p_n, p_c, p_e\}$, and establishes a secure communication channel with each server. The client instructs all pairs of communicating servers to authenticate one another.

B. The client provides—(i) a description of the desired computation, (ii) an integer value N, and (iii) a unique seed value $s_i$ to each server $p_i$, (1≤i≤n). Each seed value $s_i \in Z^*_N$, the set of integers relatively prime to N, where N denotes the product of two prime numbers p, q which are congruent to 3 mod 4. The client keeps the prime factors p, q of N as secret. The length |N| corresponds to the public key security parameter; |N|=3072 achieves the equivalent of K=128-bit security, for example. Each seed value $s_i$ is used for generating pseudorandom bits using the approach of Blum.

C. The client also provides another seed value $s_{ik}$ to each pair of servers, ($p_i$, $p_k$), (1≤i, k≤n). The length $|s_{ik}|$ corresponds to the symmetric key security parameter; K=128-bit security is achieved if $|s_{ik}|$=128, for example. Each seed value $s_{ik}$ is used for generating pseudorandom bits using AES block cipher in output feedback mode.

D. Each server, $p_i$, (1≤i≤n), creates (or retrieves from its repository, if already available) a Boolean circuit (B) that corresponds to the requested computation.

E. Each server, $p_i$, (1≤i≤n), uses $s_i$ to generate its shares for the pair of garbled values and a λ value for each wire in the circuit (B) using the pseudo random generator of Blum. Using seed $s_i$, each server, $p_i$, generates a pseudorandom bit sequence whose length equals W(2K+1), where W denotes the total number of wires in the Boolean circuit (B).

F. The client instructs the n servers, $p_i$, (1≤i≤n), to use their shares as private inputs for the secure multiparty computation protocol of Goldreich, in which the servers interact to construct shares ($GC_i$) of the Beaver et al.'s garbled circuit, GC.

While using the protocol of Goldreich 2004; Goldreich 1987, each pair of servers, ($p_i,p_k$), (1≤i,k≤n), generates pseudorandom bits using pairwise seed values $s_{ik}$. The use of seed values $s_{ik}$ in the method of the present invention eliminates the exchange of pseudorandom bits over pairwise secure communication channels, as required in the original protocol of Goldreich 2004; Goldreich 1987.

Let $A_i=(A_{00})_i\|(A_{01})_i\|(A_{10})_i\|(A_{11})_i$ denote the shares of server $P_i$ for the four garbled table entries of gate A computed using the protocol of Goldreich. Then, $GC_1$, in turn, is a concatenation of all bit strings of the form $A_i$, where the concatenation is taken over all the gates in the circuit.

G. The client instructs all the n servers, $p_i$, (1≤i≤n) to send their shares $GC_i$ to the server $p_c$. Performing only XOR operations, the server $p_c$ creates the desired circuit, $GC=GC_1 \oplus GC_2 \oplus \ldots \oplus GC_n$. Now, the client instructs the server $p_c$ to send the garbled circuit GC to server $p_e$ for evaluation. The resulting garbled circuit GC, the garbled inputs that can unlock the circuit, and the corresponding garbled outputs, remain unrecognizable to server $p_e$, even if it chooses to collude with any strict-subset of servers of the n servers, $p_i$, ($1 \le i \le n$) that participated in the creation of the garbled circuit.

H. Using the unique seed values $s_i$, ($1 \le i \le n$), the client generates garbled input values for each input wire in the circuit, and sends them to the server $p_e$ for evaluation. Using these seed values, and the secret prime factors p, q of N, the client also generates the $\lambda$ values and the two possible garbled values for each output wire in the circuit, and keeps them secret.

I. Using the garbled inputs, the server $p_e$ evaluates GC, and obtains the garbled outputs for each output wire in the circuit and sends them to the client. Note that the $\lambda$ values for all wires in the circuit, including the output wires, remains secret for server $p_e$, unless it colludes with all the n servers, $p_i$, ($1 \le i \le n$); therefore the result of the computation remains secret for server $p_c$. Using the $\lambda$ values computed in Step H, the client translates the garbled values into plaintext bits to recover the result of the requested computation.

J. The client checks whether the garbled output for each output wire in the circuit that is returned by the evaluator, $p_e$, matches with one of the two possible garbled values that it computed on its own. If there is a match for all output wires, then the client declares that the evaluator in fact carried out the requested computation.

K. Pre-computation of garbled circuits: The present method also enables the pre-computation (i.e., creation) of many versions of the garbled circuit, for a given computation, in advance, and storing them at the executing server for later use. Consequently, the requested computation can be carried out readily, without waiting for the other servers to first create a garbled circuit, and obtain it from them. Thus, the client will only incur the relatively short time taken to evaluate the garbled circuit. In other words, pre-computation will drastically improve the response time.

It should be appreciated by those of skill in the art that the techniques disclosed in the examples which follow represent techniques discovered by the inventors to function well in the practice of the systems and methods discussed herein, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

REFERENCES

M. Armbrust, A. Fox, R. Griffith, A. D. Joseph, R. Katz, A. Konwinski, G. Lee, D. Patterson, A. Rabkin, I. Stoica, and M. Zaharia, "A view of cloud computing," *Commun. ACM*, April 2010. ("Ambrust")

E. Barker et al., "Recommendation for key management—part 1: General (revision 3)," *NIST Special Publication* 800-57, July 2012 ("Barker").

D. Beaver, S. Micali, and P. Rogaway, "The round complexity of secure protocols," in *ACM STOC* '90 ("Beaver").

A. Ben-David, N. Nisan, and B. Pinkas, "Fairplaymp: A system for secure multiparty computation," in *ACM CCS*, 2008 ("Ben-David").

L. Blum, M. Blum, and M. Shub, "A simple unpredictable pseudo random number generator," *SIAM J. Comput.*, 15(2): 364-383, May 1986 ("Blum").

S. Bugiel, S. Nurnberger, A.-R. Sadeghi, and T. Schneider, "Twin clouds: Secure cloud computing with low latency," in *Proc. CMS*, 2011 ("Bugiel").

H. Carter, B. Mood, P. Traynor, and K. Butler, "Secure outsourced garbled circuit evaluation for mobile devices," in *USENIX Security*, 2013 ("Carter").

J. Domingo-Ferrer, "A provably secure additive and multiplicative privacy homomorphism, in *Proc. Int'l Conf on Information Security*, 2002 ("Domingo-Ferrer").

R. Gennaro et al., "Non interactive verifiable computing: Outsourcing computation to untrusted workers," in *CRYPTO*, 2010 ("Gennaro").

C. Gentry, "Computing arbitrary functions of encrypted data," *Commun. ACM*, March 2010 ("Gentry").

O. Goldreich, *Foundations of Cryptography: Volume 2, Basic Applications*. Cambridge University Press, 2004 ("Goldreich 2004").

O. Goldreich, S. Micali, and A. Wigderson, "How to play any mental game," in *ACM STOC*, 1987 ("Goldreich 1987").

S. Goldwasser et al., "Reusable garbled circuits and succinct functional encryption," in *ACM STOC* '13 ("Goldwasser").

W. Henecka et al., "Tasty: Tool for automating secure two-party computations," in *ACM CCS* '10 ("Henecka").

Y. Huang, D. Evans, and J. Katz, "Private set intersection: Are garbled circuits better than custom protocols," in *Network and Distributed System Security Symposium (NDSS)*. The Internet Society, 2012 ("Huang").

V. Kolesnikov, A.-R. Sadeghi, and T. Schneider, "Improved garbled circuit building blocks and applications to auctions and computing minima," in *Proceedings of the 8th International Conference on Cryptology and Network Security*, CANS '09, pages 1-20, Berlin, Heidelberg, 2009. Springer-Verlag ("Kolesnikov").

Y. Lindell and B. Pinkas, "A proof of security of yao's protocol for two-party computation," *J. Cryptol.*, 22(2):161-188, April 2009 ("Lindell 20091").

Y. Lindell and B. Pinkas, "Secure multiparty computation for privacy-preserving data mining," *Journal of Privacy and Confidentiality*, 1(1), 2009 ("Lindell 2009 II").

D. Malkhi, N. Nisan, B. Pinkas, and Y. Sella, "Fairplay—a secure two-party computation system," in *USENIX Security*, 2004 ("Malkhi").

M. Naor and B. Pinkas, "Efficient oblivious transfer protocols," in *ACM* SODA, 2001 ("Naor 2001").

M. Naor and B. Pinkas, "Computationally secure oblivious transfer," *J. Cryptology*, 18(1):1-35, 2005 ("Naor 2005").

R. L. Rivest, L. Adleman, and M. L. Dertouzos, "On data banks and privacy homomorphisms," *Foundations of secure computation*, 32(4), 1978 ("Rivest").

P. Rogaway, "The round complexity of secure protocols," Ph.D. thesis, MIT, 1991 ("Rogaway").

B. Schneier, *Applied Cryptography* ($2^{nd}$ Ed.): *Protocols, Algorithms, and Source Code in C*. John Wiley & Sons, Inc., 1995 ("Schneier").

S. Tillich and N. Smart, Circuits of basic functions suitable for MPC and FHE, http://www.cs.bris.ac.uk/Research/CryptographySecurity/MPC/("Tillich").

A. C. Yao, "Protocols for secure computations," in *IEEE Computer Society* SFCS, 1982 ("Yao 1982").

A. C.-C. Yao, "How to generate and exchange secrets," in IEEE *Computer Society SFCS*, 1986 ("Yao 1986").

What is claimed is:

1. A method comprising:
    (a) receiving, at a computing device, a selection of at least a predetermined number of servers in a cloud, said cloud comprising a cluster of devices associated with a network;
    (b) establishing, via the computing device, a connection with each selected server, said connection comprising a secure communication channel;
    (c) receiving, at each of the selected servers, client information comprising at least a description of a desired computation and a unique seed value for each selected server;
    (d) determining, via each of the selected servers, a Boolean circuit that corresponds to said desired computation, said determination comprising generating garbled values based on the unique seed value via a pseudo-random number generation algorithm, wherein said pseudo-random number generation algorithm generates a pseudorandom bit sequence comprising information corresponding to said Boolean circuit;
    (e) creating, via another server independent of the selected servers, a garbled circuit based on said determination of the Boolean circuit, said creation comprises facilitating communication between said selected servers using the pseudorandom bit sequence;
    (f) evaluating, via an evaluation server independent of the selected servers, said garbled circuit, said evaluation comprises generating, via the computing device and independent of the selected servers, garbled inputs that unlock said garbled circuit based on said unique seed values; and
    (g) determining, via the evaluation sever, garbled outputs that correspond to said garbled inputs.

2. The method of claim 1, wherein said predetermined number of servers is at least two individual servers in said cloud.

3. The method of claim 1, wherein said client information further comprises an integer value associated with a public key security parameter for each server.

4. The method of claim 3 further comprising matching, via the computing device, said generated garbled outputs as a result of said evaluation with expected garbled outputs, said matching based upon said security parameter integer value, wherein if said garbled outputs and the expected garbled outputs match at least above a threshold, said desired computation is confirmed.

5. The method of claim 1, further comprising receiving a second unique seed value for each pair of the selected servers, said second unique seed value comprising information associated with symmetric key security parameters for the selected servers.

6. The method of claim 5, wherein said garbled circuit creation further comprises generating, for each selected server, pseudorandom bits in accordance with said second unique seed value.

7. The method of claim 6, further comprising receiving shares associated with each selected server, wherein each share is implemented for said creation of the garbled circuit.

8. The method of claim 7, wherein said creation comprises performing an XOR operation of each received share.

9. The method of claim 1, wherein said determination of the Boolean circuit further comprises determining if said Boolean circuit exists, wherein if said circuit exists, retrieving information from an associated repository for performing said desired computation, and wherein if said Boolean circuit does not yet exist, creating said Boolean circuit via said selected servers.

10. The method of claim 1, wherein said pseudorandom bit sequence information comprises a length denoting a total number of wires in the Boolean circuit.

11. The method of claim 1, wherein said garbled inputs and garbled outputs are unrecognizable to said evaluation server and wherein said garbled inputs and garbled outputs remain unrecognizable upon said evaluation server colluding with any strict subset of said selected servers.

12. The method of claim 1 further comprising translating, via the computing device, said garbled output values into plaintext bits, wherein said translation occurring in association with recovering said plaintext outputs for determining a result of the desired computation.

13. The method of claim 1, further comprising:
    receiving at each of the selected servers a pseudorandom number;
    checking, at the computing device, whether the garbled output from the evaluation server for each output wire of the Boolean circuit matches with at least one of a garbled value calculated by the computing device, wherein the at least one of the garbled value is determined by one of the unique seed values, and a first and second prime number,
    wherein the pseudorandom number is defined as an integer relatively prime to the product of a first and second prime number.

14. A non-transitory computer-readable storage medium tangibly encoded with computer executable instructions, that when executed by a processor associated with a computing device, perform a method comprising:
    (a) receiving at the computing device, a selection of at least a predetermined number of servers in a cloud, said cloud comprising a cluster of devices associated with a network;

(b) establishing at the computing device, a connection with each selected server, said connection comprising a secure communication channel;

(c) receiving, at each of the selected servers, client information comprising at least a description of a desired computation and a unique seed value for each selected server;

(d) determining, via each of the selected servers, a Boolean circuit that corresponds to said desired computation, said determination comprising generating garbled values based on the unique seed value via a pseudo-random number generation algorithm, wherein said pseudo-random number generation algorithm generates a pseudorandom bit sequence comprising information corresponding to said Boolean circuit;

(e) creating, via another server independent of the selected servers, a garbled circuit based on said determination of the Boolean circuit, said creation comprises facilitating communication between said selected servers using the pseudorandom bit sequence;

(f) evaluating, via an evaluation server independent of the selected servers, said garbled circuit, said evaluation comprises generating, via the computing device and independent of the selected servers, garbled inputs that unlock said garbled circuit based on said unique seed values; and (g) determining via the evaluation server, garbled outputs that correspond to said garbled inputs.

15. The non-transitory computer-readable storage medium of claim 14 further comprising:

(a) receiving a second unique seed value for each pair of selected servers, said second unique seed value comprising information associated with symmetric key security parameters for the selected servers;

(b) generating, for each selected server, pseudorandom bits in accordance with said second unique seed value; and (c) receiving shares associated with each selected server, wherein each share is implemented for said creation of the garbled circuit, wherein said creation comprises performing an XOR operation of each received share.

16. The non-transitory computer-readable storage medium of claim 14, wherein said determination of the Boolean circuit further comprises determining if said Boolean circuit exists, wherein if said circuit exists retrieving information from an associated repository for performing said desired computation, and wherein if said Boolean circuit does not yet exist, creating said Boolean circuit via said selected servers.

17. The non-transitory computer-readable storage medium of claim 14 further comprising translating said garbled output values into plaintext bits, said translation occurring in association with recovering said plaintext outputs for determining a result of the desired computation.

18. The non-transitory computer-readable storage medium of claim 14, wherein said client information further comprises an integer value associated with a security parameter for each server, wherein said method further comprises matching said generated garbled outputs as a result of said evaluation with said expected garbled outputs, said matching based upon said security parameter integer value, wherein if said garbled outputs and expected garbled outputs match at least above a threshold, said desired computation is confirmed.

19. A system comprising at least one computing device comprising:

(a) memory storing computer-executable instructions; and (b) one or more processors for executing said computer-executable instructions, comprising:

(i) receiving via the at east one computing device, a selection of at least a predetermined number of servers in a cloud, said cloud comprising a cluster of devices associated with a network;

(ii) establishing via the at least one computing device, a connection with each selected server, said connection comprising a secure communication channel;

(iii) receiving at each of the selected servers, client information comprising at least a description of a desired computation and a unique seed value for each selected server;

(iv) determining via the selected servers, a Boolean circuit that corresponds to said desired computation, said determination comprising generating garbled values based on the unique seed value via a pseudo-random number generation algorithm, wherein said pseudo-random number generation algorithm generates a pseudorandom bit sequence comprising information corresponding to said Boolean circuit;

(v) creating at another server independent of the selected servers, a garbled circuit based on said determination of the Boolean circuit, said creation comprises facilitating communication between said selected servers using the pseudorandom bit sequence;

(vi) evaluating via an evaluation server independent of the selected servers, said garbled circuit, said evaluation comprises generating, via the at least one computing device and independent of the selected servers garbled inputs that unlock said garbled circuit based on said unique seed values; and (vii) determining at the evaluation server, garbled outputs that correspond to said garbled inputs.

20. The system of claim 19 further comprising:

(a) receiving a second unique seed value for each pair of selected servers, said second unique seed value comprising information associated with symmetric key security parameters for the selected servers;

(b) generating, for each selected server, pseudorandom bits in accordance with said second unique seed value; and (c) receiving shares associated with each selected server, wherein each share is implemented for said creation of the garbled circuit, wherein said creation comprises performing an XOR operation of each received share.

21. The system of claim 19 further comprising matching said generated garbled outputs as a result of said evaluation with expected garbled outputs, said matching based upon a security parameter integer value associated with each selected server, wherein if said garbled outputs and expected garbled outputs match at least above a threshold, said desired computation is confirmed.

* * * * *